US008554588B2

(12) United States Patent
Jones et al.

(10) Patent No.: US 8,554,588 B2
(45) **Date of Patent: *Oct. 8, 2013**

(54) INSURANCE PRODUCT, RATING SYSTEM AND METHOD

(75) Inventors: Richard M. Jones, Hartford, CT (US); Gregory M. Barats, Hartford, CT (US)

(73) Assignee: Hartford Steam Boiler Inspection and Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,307

(22) Filed: Apr. 27, 2012

(65) Prior Publication Data

US 2012/0278109 A1 Nov. 1, 2012

Related U.S. Application Data

(63) Continuation of application No. 11/153,305, filed on Jun. 15, 2005, now Pat. No. 8,195,484.

(51) Int. Cl.
*G06Q 40/00* (2012.01)

(52) U.S. Cl.
USPC .......... 705/4

(58) Field of Classification Search
USPC .......... 705/4
See application file for complete search history.

(56) References Cited

U.S. PATENT DOCUMENTS

2006/0015426 A1* 1/2006 Freund .......... 705/35

* cited by examiner

*Primary Examiner* — Thomas M Hammond, III
(74) *Attorney, Agent, or Firm* — Greenberg Traurig, LLP

(57) ABSTRACT

In the present invention, an insurance product, rating system and method generally relates to a rating and pricing system for quantifying the risk that the annual savings will not fall below specified levels associated with implementing and maintaining economic improvements. The product, system and method can be applied to various industries, including, power generation, petro-chemical, manufacturing and refining facilities. Various embodiments disclosed herein relate to systems and products for providing a computer implemented insurance product.

30 Claims, 23 Drawing Sheets

200 DETERMINE INSURED FLOOR $$$ FOR EACH YEAR BASED ON A CONFIDENCE LEVEL

202 FOR EACH POLICY YEAR, UNDERWRITER SELECTS RISK ACCEPTANCE LEVELS

204 IS INSURED SAVINGS BELOW INSURED FLOOR VALUES ?

YES

NO

206 INSURER PAYS INSURED DIFFERENCE

208 END

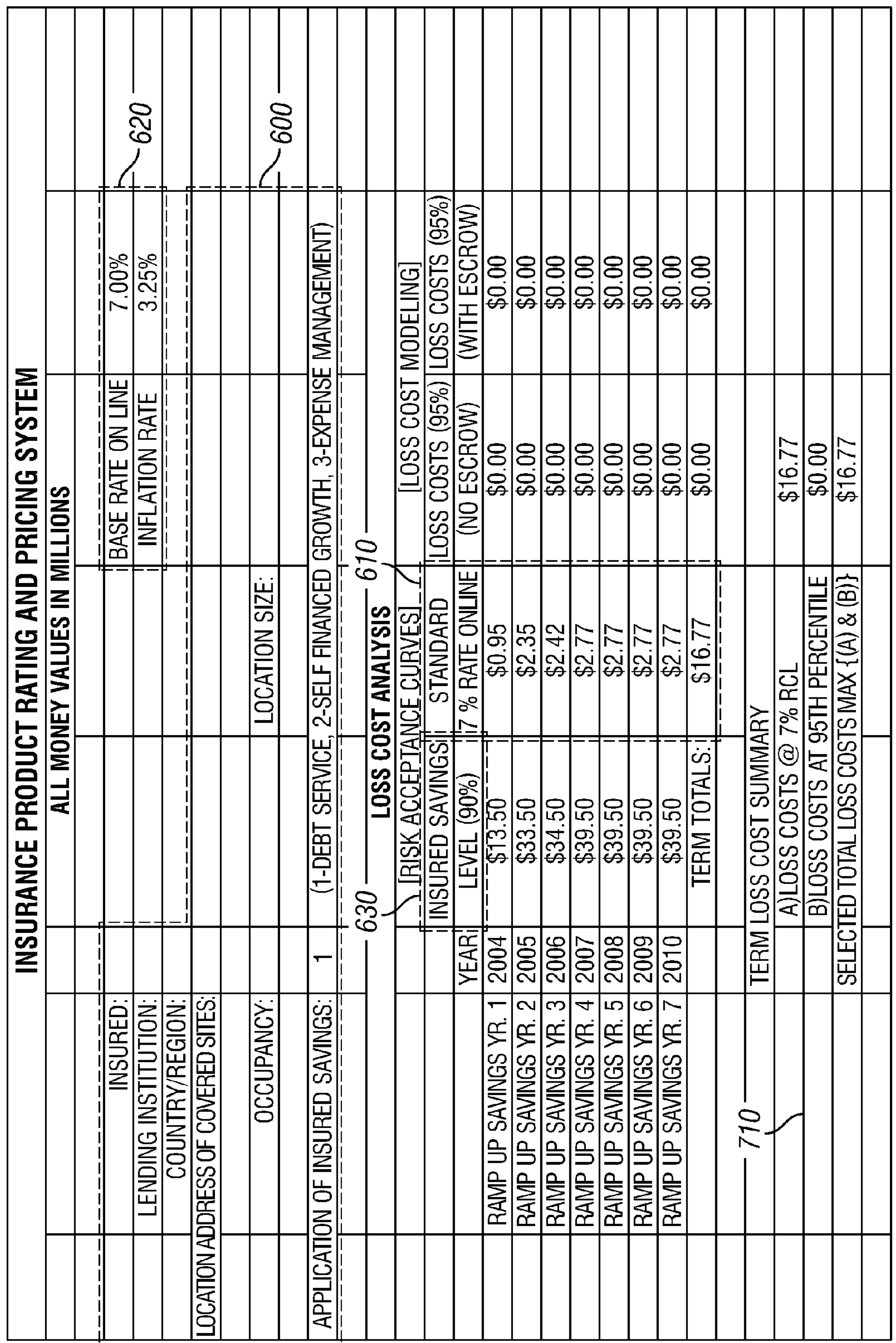

INSURANCE PRODUCT RATING AND PRICING SYSTEM

ALL MONEY VALUES IN MILLIONS

| | | | | | |
|---|---|---|---|---|---|
| INSURED: | | | | BASE RATE ON LINE | 7.00% |
| LENDING INSTITUTION: | | | | INFLATION RATE | 3.25% |
| COUNTRY/REGION: | | | | | |
| LOCATION ADDRESS OF COVERED SITES: | | | | | |
| OCCUPANCY: | | | LOCATION SIZE: | | |
| APPLICATION OF INSURED SAVINGS: | 1 | (1-DEBT SERVICE, 2-SELF FINANCED GROWTH, 3-EXPENSE MANAGEMENT) | | | |

LOSS COST ANALYSIS

| | | [RISK ACCEPTANCE CURVES] | | [LOSS COST MODELING] | |
|---|---|---|---|---|---|
| | | INSURED SAVINGS | STANDARD | LOSS COSTS (95%) | LOSS COSTS (95%) |
| | YEAR | LEVEL (90%) | 7 % RATE ONLINE | (NO ESCROW) | (WITH ESCROW) |
| RAMP UP SAVINGS YR. 1 | 2004 | $13.50 | $0.95 | $0.00 | $0.00 |
| RAMP UP SAVINGS YR. 2 | 2005 | $33.50 | $2.35 | $0.00 | $0.00 |
| RAMP UP SAVINGS YR. 3 | 2006 | $34.50 | $2.42 | $0.00 | $0.00 |
| RAMP UP SAVINGS YR. 4 | 2007 | $39.50 | $2.77 | $0.00 | $0.00 |
| RAMP UP SAVINGS YR. 5 | 2008 | $39.50 | $2.77 | $0.00 | $0.00 |
| RAMP UP SAVINGS YR. 6 | 2009 | $39.50 | $2.77 | $0.00 | $0.00 |
| RAMP UP SAVINGS YR. 7 | 2010 | $39.50 | $2.77 | $0.00 | $0.00 |
| | | TERM TOTALS: | $16.77 | $0.00 | $0.00 |

| | |
|---|---|
| TERM LOSS COST SUMMARY | |
| A)LOSS COSTS @ 7% RCL | $16.77 |
| B)LOSS COSTS AT 95TH PERCENTILE | $0.00 |
| SELECTED TOTAL LOSS COSTS MAX {(A) & (B)} | $16.77 |

FIG. 7A-1

| ENGINEERING AND INSURANCE EXPENSE SCHEDULE | | | | | | |
|---|---|---|---|---|---|---|
| | | MOST LIKELY | INSURED SAVINGS | INSURANCE | ENGINEERING | INS+ENG INFLATED |
| | YEAR | SAVINGS ESTIMATE | LEVEL (90%) | ESTIMATED COSTS | ESTIMATED COSTS | ESTIMATED COSTS |
| SAVINGS ACHIEVED YR. 1 | 2004 | $15.00 | $13.50 | $0.05 | $2.00 | $2.05 |
| SAVINGS ACHIEVED YR. 2 | 2005 | $37.00 | $33.50 | $0.05 | $1.00 | $1.08 |
| SAVINGS ACHIEVED YR. 3 | 2006 | $38.00 | $34.50 | $0.05 | $0.75 | $0.85 |
| SAVINGS ACHIEVED YR. 4 | 2007 | $42.00 | $39.50 | $0.05 | $0.50 | $0.61 |
| SAVINGS ACHIEVED YR. 5 | 2008 | $42.00 | $39.50 | $0.05 | $0.25 | $0.34 |
| SAVINGS ACHIEVED YR. 6 | 2009 | $42.00 | $39.50 | $0.05 | $0.25 | $0.35 |
| SAVINGS ACHIEVED YR. 7 | 2010 | $42.00 | $39.50 | $0.05 | $0.13 | $0.21 |
| | | | | $0.35 | $4.88 | $5.50 |
| | | | | | | |
| | ENGINEERING QUALITY UNDERWRITING (CREDITS)/DEBTS | | | | | |
| | | ORGANIZATION/CULTURE | | 1.0% | (10%) - 10% | |
| | | NEW TECHNOLOGY APPLICATIONS | | 1.0% | (10%) - 10% | |
| | | MANAGEMENT MOTIVATION | | -3.0% | (10%) - 10% | |
| | | SUPERVISOR MOTIVATION | | 0.0% | (10%) - 10% | |
| | | COMPLEXITY | | 0.0% | (10%) - 10% | |
| | | | TOTAL | -1.0% | (20%) - 25% | |

FIG. 7A-2

| | | | | | |
|---|---|---|---|---|---|
| | UNDERWRITING QUALITY (CREDITS)/DEBTS | | | | |
| | | EXCLUSIONS | | 10% | (10%) - 10% |
| | | SIR/DEDUCTABLE | | 5% | (10%) - 10% |
| | | SAVINGS MEASUREMENT & VERIFICATION | | 10% | (10%) - 10% |
| | | | TOTAL | 25.0% | (20%) - 25% |
| | | | | | |
| | | | | INSURANCE | ENINEERING |
| PREMIUM | ADJUSTED PREMIUM | | | $20.79 | $0.00 |
| | INSURANCE & ENGINEERING EXPENSES | | | $0.39 | $5.11 |
| | PROFIT | | | $2.12 | $0.00 |
| | ALLOCATED REINSURANCE COSTS | | | $0.00 | $0.00 |
| | TAXES | | | $0.00 | $0.00 |
| | COMMISSIONS | | | $0.00 | $0.00 |
| | | TOTAL TERM POLICY PREMIUM= | | $23.29 | $5.11 |
| | | | | | |
| | | ANNUALIZED POLICY PREMIUM= | | $4.06 | |
| | | | | | |

*FIG. 7A-3*

| LOSS COST PREMIUM COMPONENT PROBABILITIES CALCULATIONS | | | | | |
|---|---|---|---|---|---|
| | ANNUAL SAVINGS ACHIEVED | INSURED FLOOR (X$ AND BELOW) | INSURANCE LOSS EVENTS | INSURANCE LOSS AMOUNT | |
| SAVINGS ACHIEVED YR. 1 | $15.79 | $13.50 | 0 | $ - | |
| SAVINGS ACHIEVED YR. 2 | $38.09 | $33.50 | 0 | $ - | |
| SAVINGS ACHIEVED YR. 3 | $39.11 | $34.50 | 0 | $ - | |
| SAVINGS ACHIEVED YR. 4 | $45.45 | $39.50 | 0 | $ - | |
| SAVINGS ACHIEVED YR. 5 | $45.45 | $39.50 | 0 | $ - | |
| SAVINGS ACHIEVED YR. 6 | $45.45 | $39.50 | 0 | $ - | |
| SAVINGS ACHIEVED YR. 7 | $45.45 | $39.50 | 0 | $ - | |
| | | | 0 | $ - | |
| | | | $ - | | |
| | | | | | |
| | | | LOSSES WITH ESCROW | ESCROW VALUE | |
| | | SAVINGS ACHIEVED YR. 1 | $ - | $2.29 | $ - |
| | | SAVINGS ACHIEVED YR. 2 | $ - | $6.88 | $ - |
| | | SAVINGS ACHIEVED YR. 3 | $ - | $11.48 | $ - |
| | | SAVINGS ACHIEVED YR. 4 | $ - | $17.43 | $ - |
| | | SAVINGS ACHIEVED YR. 5 | $ - | $23.37 | $ - |
| | | SAVINGS ACHIEVED YR. 6 | $ - | $29.32 | $ - |
| | | SAVINGS ACHIEVED YR. 7 | $ - | $35.26 | $ - |
| | | | | | $ - |
| | | | | | |
| | | | | | |

640

650

660

670

DEVELOP CLAIM COUNT, CLAIM AMOUNT AND CLAIM RISK

| ANNUAL NET CASH MARGIN ACHIEVEMENT CUMULATIVE PROBABILITY DISTRIBUTIONS | | | | | | | | | | | | | |
|---|---|---|---|---|---|---|---|---|---|---|---|---|---|
| YEAR 1 SAVINGS | YEAR 1 CDF | YEAR 2 SAVINGS | YEAR 2 CDF | YEAR 3 SAVINGS | YEAR 3 CDF | YEAR 4 SAVINGS | YEAR 4 CDF | YEAR 5 SAVINGS | YEAR 5 CDF | YEAR 6 SAVINGS | YEAR 6 CDF | YEAR 7 SAVINGS | YEAR 7 CDF |
| 7.58 | 1 | 23.86 | 1 | 24.47 | 1 | 28.80 | 1 | 28.60 | 1 | 28.6 | 1 | 28.6 | 1 |
| 7.66 | 1 | 24.00 | 1 | 24.61 | 1 | 28.79 | 1 | 28.79 | 1 | 28.79 | 1 | 28.79 | 1 |
| 7.75 | 0.9999 | 24.14 | 0.9998 | 24.76 | 0.9999 | 24.93 | 0.9999 | 28.99 | 0.9999 | 28.88 | 0.9999 | 28.88 | 0.9999 |
| 7.83 | 0.9998 | 24.28 | 0.9998 | 24.50 | 0.9999 | 29.18 | 0.9999 | 29.18 | 0.9999 | 29.18 | 0.9999 | 29.18 | 0.9999 |
| 7.91 | 0.9998 | 24.42 | 0.9998 | 25.04 | 0.9998 | 29.37 | 0.9999 | 29.37 | 0.9999 | 29.37 | 0.9999 | 29.37 | 0.9999 |
| 7.99 | 0.9997 | 24.56 | 0.9998 | 25.19 | 0.9998 | 29.57 | 0.9998 | 29.57 | 0.9998 | 29.57 | 0.9998 | 29.57 | 0.9998 |
| 8.07 | 0.9996 | 24.71 | 0.9998 | 25.33 | 0.9998 | 29.76 | 0.9998 | 29.76 | 0.9998 | 29.76 | 0.9998 | 29.76 | 0.9998 |
| 8.15 | 0.9996 | 24.05 | 0.9998 | 25.48 | 0.9998 | 29.95 | 0.9998 | 29.95 | 0.9998 | 29.95 | 0.9998 | 29.95 | 0.9998 |
| 8.24 | 0.9995 | 24.99 | 0.9998 | 25.52 | 0.9998 | 30.14 | 0.9998 | 30.14 | 0.9998 | 30.14 | 0.9998 | 30.14 | 0.9998 |
| 8.32 | 0.9994 | 25.13 | 0.9998 | 25.76 | 0.9998 | 30.34 | 0.9997 | 30.34 | 0.9997 | 30.34 | 0.9997 | 30.34 | 0.9997 |
| 8.40 | 0.9994 | 25.27 | 0.9998 | 25.91 | 0.9998 | 30.53 | 0.9997 | 30.53 | 0.9997 | 30.53 | 0.9997 | 30.53 | 0.9997 |
| 8.49 | 0.9993 | 25.42 | 0.9997 | 26.06 | 0.9998 | 30.72 | 0.9995 | 30.72 | 0.9995 | 30.72 | 0.9995 | 30.72 | 0.9995 |
| 8.57 | 0.9991 | 25.56 | 0.9997 | 26.20 | 0.9998 | 30.92 | 0.9995 | 30.92 | 0.9995 | 30.92 | 0.9995 | 30.92 | 0.9995 |
| 8.65 | 0.999 | 25.70 | 0.9997 | 26.34 | 0.9998 | 31.11 | 0.9994 | 31.11 | 0.9994 | 31.11 | 0.9994 | 31.11 | 0.9994 |
| 8.73 | 0.9989 | 25.84 | 0.9996 | 26.48 | 0.9998 | 31.30 | 0.9993 | 31.30 | 0.9993 | 31.30 | 0.9993 | 31.30 | 0.9993 |
| 8.82 | 0.9988 | 25.99 | 0.9996 | 26.63 | 0.9997 | 31.49 | 0.9989 | 31.49 | 0.9989 | 31.49 | 0.9989 | 31.49 | 0.9989 |
| 8.90 | 0.9986 | 26.13 | 0.9991 | 26.77 | 0.9996 | 31.69 | 0.9985 | 31.69 | 0.9985 | 31.69 | 0.9985 | 31.69 | 0.9985 |
| 8.98 | 0.9982 | 26.27 | 0.9989 | 26.92 | 0.9995 | 31.88 | 0.998 | 31.88 | 0.998 | 31.88 | 0.998 | 31.88 | 0.998 |
| 9.06 | 0.9981 | 26.41 | 0.9987 | 27.06 | 0.9995 | 32.07 | 0.9974 | 32.07 | 0.9974 | 32.07 | 0.9974 | 32.07 | 0.9974 |
| 9.15 | 0.998 | 26.55 | 0.9983 | 27.27 | 0.9989 | 32.27 | 0.9973 | 32.27 | 0.9973 | 32.27 | 0.9973 | 32.27 | 0.9973 |
| ****** | ****** | ****** | ****** | ****** | ****** | ****** | ****** | ****** | ****** | ****** | ****** | ****** | ****** |

| AREA | INITIATIVE CODE | INITIATIVE DESCRIPTION | BENEFIT TYPE |
|---|---|---|---|
| DCS | DCS-16 | IMPROVE YIELDS BY ENHANCED PROPYLENE RECOVERY IN PP | INCREMENTAL COPY |
| AROMATICS | SULF 500 | MODIFY STRIPPER CONTROL SCHEME-ADJUST OPERATIONAL CONDITIONS | ENERGY |
| BOILER | CA4 | 2% LIQUOR LOSS REDUCTION | OPERATIONAL |
| BOILER | CA10-BA | UTILIZATION OF MAXIMUM CAPACITY | INCREMENTAL CAPACITY |
| ENERGY | ES-10 | NITROGEN PIPELINE | OPERATIONAL |
| ENERGY | E7-2 | REDUCTION OF FUEL OIL CONSUMPTION | ENERGY |
| ENERGY | E7-3 | TG-E CONDENSING HT RECOVERY | ENERGY |
| CRACKER | 06 | ESTABLISH QUENCH OIL HEAT EXCHANGER CLEANING PROGRAM | OPERATIONAL |
| CRACKER | 05 | INCREASE QUENCH FITTING OUTLET TEMPERATURE | ENERGY |
| CRACKER | 01 | RESOLVE U01 C3 SPLITTER OPERATING ISSUES | INCREMENTAL COPY |
| PROCESS 1 | V-1 | IMPROVE EDC DIRECT CHLORINATION | OPERATIONAL |
| PROCESS 1 | V-2 | INCREASE EDC FURNACE CRACKING DEPTH | INCREMENTAL COPY |

*FIG. 8A-1*

| BENEFIT ITEM | ENGINEERING NCM ESTIMATE | UNITS | CAPITAL $M | INITIATIVE START DATE | PROJECT TIME (MO) |
|---|---|---|---|---|---|
| LOSS REDUCTION IN PROPYLENE | 0.10 | KMTA | 0.34 | 16-JUL | 17.62 |
| ENERGY - STEAM + COOLING WATER | 2.40 | T/H | 0.23 | 8-MAY | 22.75 |
| REDUCED LIQUOR LOSSES | 1000 | MT/YR | 0.10 | 27-FEB | 14.04 |
| ADDITIONAL NAOH | 2332 | T/Y | 0.00 | 29-DEC | 8.13 |
| PIPELINE RATHER THAN TRUCKED N2 | 4321 | HR/YR | 0.33 | 25-DEC | 24.68 |
| FRACTION OF MAXIMUM REDUCTION ACHIEVED | 0.30 | FRACTION | 3.00 | 31-AUG | 25.25 |
| FRACTION TURBINE EXHAUST HEAT RECOVERED | 0.90 | FRACTION | 0.76 | 15-MAY | 13.08 |
| ENERGY SAVINGS | 11.23 | GCAL/HR | 0.10 | 28-SEP | 12.04 |
| STEAM SAVINGS | 4.30 | GCAL/HR | 0.23 | 1-JUL | 26.13 |
| ADDITIONAL FEED, CREATING PGP INCREASE | 2.90 | T/H | 0.32 | 16-SEP | 18.23 |
| REDUCED ETHYLENE CONSUMPTION | 587 | MT | 0.10 | 30-SEP | 9.05 |
| INCREASE VCM VOLUME | 4320 | MT | 0.00 | 25-NOV | 27.38 |

*FIG. 8A-2*

INITIATIVE V-2: INCREASE EDC FURNACE CRACKING DEPTH

| **PHASE 1 ACTION PLAN** | | | | | | | | |
|---|---|---|---|---|---|---|---|---|
| SCHEDULE (WK) | 60 | YEAR 1 | YEAR 2 | YEAR 3 | YEAR 4 | YEAR 5 | YEAR 6 | YEAR 7 |
| BENEFITS PLANNED REALIZATION ($M/YR) | | 0.13 | 0.16 | 0.27 | 0.27 | 0.27 | 0.27 | 0.27 |
| START DATE | XX-XX-XXXX | | | | | | | |
| **EXECUTION PLAN** **START WEEK** | 13 | 40 | 52 | 52 | 52 | 52 | 52 | 52 |
| BENEFIT WEEKS | | 0 | 32 | 52 | 52 | 52 | 52 | 52 |
| SCHEDULE (WK) | 60 | YEAR 1 | YEAR 2 | YEAR 3 | YEAR 4 | YEAR 5 | YEAR 6 | YEAR 7 |
| BENEFITS PLANNED REALIZATION ($M/YR) | | 0.00 | 0.16 | 0.27 | 0.27 | 0.27 | 0.27 | 0.27 |
| DELAY COST | 0.13 | 0.13 | 0.0 | 0.0 | 0.0 | 0.0 | 0.0 | 0.0 |
| LOSS PER WEEK OF DELAY/SCHEDULE SHIFT $M/WEEK | 0.005 | | | | | | | |
| COMPANY INITIATIVE MANAGER | **NAME** | | | | | | | |

| **PHASE 1 ACTION PLAN** | **QUARTER** | 1 | | | | | | | | | | | | | |
|---|---|---|---|---|---|---|---|---|---|---|---|---|---|---|---|
| | **MONTH** | 1 | | | | 2 | | | | 3 | | | | 4 | |
| **PROJECT SCHEDULE** | **WEEK** | 1 | 2 | 3 | 4 | 5 | 6 | 7 | 8 | 9 | 10 | 11 | 12 | 13 | 14 |
| | **RESPONSIBILITY** | | | | | | | | | | | | | | - |
| DETAILED PROCESS EVALUATION | **NAME** | | | | | | | | | | | | | | - |
| CONFIRM EXPECTED IMPROVEMENT | **NAME** | | | | | | | | | | | | | | - |
| CHANGE THE PROCEDURES | **NAME** | | | | | | | | | | | | | | - |
| TRAIN OPERATORS | **NAME** | | | | | | | | | | | | | | - |
| IMPLEMENTATION OF CHANGE | **NAME** | | | | | | | | | | | | | | - |
| AUDIT REVIEW/MEASURE BENEFITS | **NAME** | | | | | | | | | | | | | | - |
| INCREASE UPGRADE TO FURNACE CRACKING DEPTH | **NAME** | | | | | | | | | | | | | | - |

970 980 960

| **INITIATIVE V-2 RESOURCE REQUIREMENTS** | | **YEAR 1** | | | | **YEAR 2** | | | | **YEAR 3** | | | |
|---|---|---|---|---|---|---|---|---|---|---|---|---|---|
| | | 1Q | 2Q | 3Q | 4Q | 1Q | 2Q | 3Q | 4Q | 1Q | 2Q | 3Q | 4Q |
| COMPANY PROCESS ENGINEERING | | | 0.1 | 0.1 | 0.1 | 0.1 | 0.1 | 0.1 | 0.1 | 0.1 | | | |
| COMPANY PROCESS CONTROL | | | - | - | - | - | - | - | - | - | | | |
| COMPANY MAINTENANCE | | | 0.1 | 0.1 | 0.1 | 0.1 | 0.1 | 0.1 | 0.1 | 0.1 | | | |
| COMPANY OPERATIONS | | | 0.2 | 0.2 | 0.2 | 0.2 | 0.2 | 0.2 | 0.2 | 0.2 | | | |
| COMPANY TOTAL | | | 0.4 | 0.4 | 0.4 | 0.4 | 0.4 | 0.4 | 0.4 | 0.4 | | | |

| INITIATIVE # | INITIATIVES | | |
|---|---|---|---|
| | AREA | DESCRIPTION | DELIVERABLE (1418) |
| 1 (1408) | PLANT 1 (1410) | MOVE ANALYZER TO TRAYS AND MODIFY REGULATORY CONTROL ON FINAL PRODUCT COLUMNS. | THE TUNED CONTROLLER SETTINGS. REPORT DESCRIBING THE CONTROL SCHEME AND OPERATION. REPORT SUMMARIZING RESULTS AND SHOWING GRAPHS OF DYNAMIC SIMULATION. REPORT SHOWING THE BENEFITS ACHIEVED. |
| 3 | SITE 12 | REDUCE PRESSURE IN STRIPPER AND SAVE ENERGY. (1412) | REPORT DESCRIBING THE SAVINGS ACHIEVEMENT. (1420) |
| 4 | PLANT 6 | REDUCE TIME TO DRY CATALYST AFTER REGEN. (1414) | ARRANGED VISIT TO WITNESS BEST PRACTICE EXECUTION. ASSISTANCE OF BRASKEM IN DEVELOPMENT OF NEW PROCEDURE. A MEASUREMENT FINAL REPORT SHOWING THE BENEFITS ACHIEVED. |

| INITIATIVE # | BENEFIT | | MEASUREMENT | | | | | | | |
|---|---|---|---|---|---|---|---|---|---|---|
| | BENEFIT ITEM | UNITS | VOLUMETRIC TARGET | PROCESS INSTRUMENT TAG | BASE LINE VALUE | MEASURED VALUE | MEASUREMENT METHOD | MEASUREMENT DATE | AGREED BY (INITIALS) (1424) | NOTES |
| 1422 | PRODUCTION EFFICIENCY IMPROVEMENT | T/H | 0.35 | 120-A | 5.2 | 4.9 | DAILY AVERAGE | MM/DD/YYYY | | TAKEN AFTER SECOND SHIFT |
| | ENERGY-STEAM+ COOLING WATER | T/H | 0.43 | 1700-1, 1700-2, 1700-3 | 23.3 | 22.865 | MONTHLY AVERAGE | MM/DD/YYYY | | TAKEN ON 15TH OF AVERAGE MONTH |
| | YIELD IMPROVEMENT | T/H | 68 | 34532-12 | 1203 | 1274 | QUARTERLY AVERAGE | MM/DD/YYYY | | TAKEN ON LAST DAY OF EACH QUARTER |

*FIG. 12B*

| INITIATIVE # | IMPLEMENTATION TARGET DATE | | |
|---|---|---|---|
| | TARGET DATE | ACTUAL DATE | DATE COMPLETED |
| 1 | MM/DD/YY | MM/DD/YY | MM/DD/YY |
| 3 | MM/DD/YY | MM/DD/YY | MM/DD/YY |
| 4 | MM/DD/YY | MM/DD/YY | MM/DD/YY |

| INITIATIVE # | SAVINGS | | | |
|---|---|---|---|---|
| | BASE LINE PRICE | TARGET | ACHIEVED | SAVINGS COMMENTS |
| 1 | $.$$ | $345,607 | $296,235 | |
| 3 | $.$$ | $145,234 | $146,923 | |
| 4 | $.$$ | $534,534 | $558,116 | |

INSURANCE PRODUCT, RATING SYSTEM AND METHOD

CROSS-REFERENCE TO RELATED APPLICATIONS

This application is a continuation of U.S. patent application Ser. No. 11/153,305, entitled "INSURANCE PRODUCT, RATING SYSTEM AND METHOD," filed on Jun. 15, 2005 now U.S. Pat. No. 8,195,484.

STATEMENTS REGARDING FEDERALLY SPONSORED RESEARCH OR DEVELOPMENT

N/A

REFERENCE TO A MICROFICHE APPENDIX

N/A

BACKGROUND OF THE INVENTION

1. Field of the Invention

Pricing and rating methods for property and property-related asset performance insurance products can be classified into two categories: Value-based (VB) rating and Frequency-Severity (FS) rating. In both cases insurance costs are directly related to the financial loss potentials, but the computational methods reflect the characteristics of the property or assets being insured.

VB rating generally is applied to situations where risk or loss potential can be characterized by a series of variables. For example, the loss potential and pricing for a new car may be determined by the car type, the type of loss (e.g., collision, liability, glass windshield) the amount and type of miles driven, the driving record of the insured, the geographical location and perhaps other variables. Given these variables, loss potentials have been analyzed and tables produced enabling the underwriter to look up the rates, expressed in dollars of premium/dollar of coverage, in tables. The underwriter typically multiplies the client-specific variables by the corresponding rates then adds in company-specific administrative costs to compute the overall policy premium.

For property VB insurance, some common underwriting variables are business type, building activity (e.g., hospitals, office buildings, laboratories, etc.), square footage or other attributes of size, construction attributes, fire sprinkler coverage, number of stories, location, and age. Premium rates expressed are generally categorized by these variables and together produce a premium rate. This value multiplied by the building value produces the policy premium. Actual premium values may vary by historical precedent of pricing, market demands, policy terms and conditions, contents type and property replacement values.

FS pricing is a rating and pricing method for situations where there can be large differences between insureds in the same type of industry and geographical area. In this method the probability or failure frequency (events/year) of an insurance claim or failure may be modeled or directly obtained from available data.

Engineering and underwriting risk modifiers are factors applied to the loss cost computed premium that adjust for specific customer attributes present in the current situation. For example, an engineering risk modification factor to increase the loss cost 10% could be applied for clients who have poor procedures for record-keeping and plant cleanliness. Engineering inspectors have identified a high correlation with these behaviors and customers who will have insurance claims. An underwriting risk modification factor of 10% could decrease the policy premium if high deductibles and restricted coverages are negotiated with the client. These engineering and underwriting risk modification factors make detailed premium changes based on the specific attributes of the client and the policy terms and conditions.

An example of the FS pricing method for a client is applied to an equipment breakdown premium development for a power generation station 100 shown in FIG. 1. The station has two (2) simple cycle GE 7FA turbine generators 102, 104 with two (2) transformers 106, 108 and various types of electrical switchgear and equipment (only switch 110 is shown). The first part of the premium calculation contains the frequency and severity calculation which determines the loss cost component of the premium. There are risk modification factors that customize the loss cost component for the specific client being analyzed. These factors can increase or decrease the credit and debit percentage that allows underwriting to modify the loss cost to reflect the subjective attributes (e.g., engineering factors) of the client, for example, housekeeping, recordkeeping, reliability planning, the number of equipment spares available and underwriting factors such as the deductible value selected.

The next part of the premium calculation determines the client-specific expenses, costs and profit. Another component of the premium calculation, the Excess Loss Potential refers to a loss cost premium component that accounts for the very low frequency, but very high severity loss events that are appropriate for the client. Examples of such loss events include five hundred (500) year recurrence period earthquakes, tsunamis and hurricanes. The loss event severities may be determined by specialized catastrophic modeling software. A portion of the insurance company's total loss potential may be allocated to each client as the Excess Loss Potential component of the premium.

The client may also be subjected to engineering inspections associated with jurisdictional requirements of the state or other governmental bodies. The underwriting process also includes certain client-specific costs associated with meetings, travel and the like.

Expenses considered in the underwriting process can also include costs for re-insurance and are usually added when the underwriter buys facultative re-insurance—re-insurance on a specific account. Although other expenses that involve a proration of portfolio, line of business, department, or division expenses to the account level may also be added. Other premium costs are typically taxes, commissions to brokers, profit margin and other specified premium cost adders in the company's underwriting guidelines.

The FS pricing for the example above is shown below for constructing an equipment breakdown insurance price for a simple cycle gas turbine generation facility:

| Equipment | Annual Failure Frequency | Severity | Premium (Loss Costs) |
|---|---|---|---|
| 2 GE 7FA turbines | 0.025 | $80,000,000 | $2,000,000 |
| 2 Transformers | 0.015 | $4,000,000 | $60,000 |
| Switchgear + Electrical | 0.030 | $1,000,000 | $30,000 |
| | | Total Loss Costs: | $2,090,000 |
| Engineering/Underwriting Modifier (+20% − 15%) | | [−10%] | $1,881,000 |
| | Excess Loss Potential: | | $100,000 |
| | Engineering Expenses | | $25,000 |
| | Underwriting Expenses | | $10,000 |
| | Allocated Expenses | | $300,000 |
| | Taxes, Commissions | | $30,000 |
| | Profit (5%) | | $115,000 |
| | Total Policy Premium: | | $2,461,000 |

Policy rating and pricing applied to property-related insurance pricing generally is a combination of applying the VB and FS methods. The insured's (client) property often contains a mix of highly specific equipment and other activities that are common to many similar types of locations. A client's power generation company may own a small number of highly specialized power generation locations that are rated and priced using FS but also has several branch offices where the premium may be computed by the VB method.

2. Brief Summary of the Invention

The present invention referred to herein as the insurance product, rating system and method generally relates to a rating and pricing system for quantifying the risk that the annual savings will not fall below specified levels associated with implementing and maintaining economic improvements. The invention typically involves a unique combination of qualitative and quantitative functions and factors combined in a novel fashion to develop premium costs for risk transfer associated with insuring a minimum savings amount annually or in aggregate over a multi-year policy term.

Insurance pricing systems where there may be a large amount of exposure and loss data available use standard statistical and probabilistic methods. Policies are often standardized in format and simplified to the point where underwriters construct premiums from tables where the risk attributes such as insured's age, car type, location, or building values are the key elements used to lookup the appropriate rates. Other insurance policies, such as for property insurance, may include a premium component developed from catastrophe models which estimate losses from earthquakes, for example.

Insurance pricing systems are normally designed for products which are marketed to a large number of customers usually on an annual basis, each with a relatively small loss potential. The present invention comprises an insurance product rating and pricing system designed for a relatively small number of insureds annually or over a multi-year term with each insured having a relatively large exposure. This situation cannot rely on the Law of Large Numbers principle of statistics but applies as much knowledge and actual performance data as possible into the development of the risk analysis and subsequently the premium development.

The insurance policy rating and pricing system according to the present invention may generally be based on a risk analysis where actual performance data, technical uncertainties, and other factors are combined to form input information for the pricing system. The input files, called annual aggregate risk distributions, quantify the net performance risk of all initiatives for achieving the net annual savings for each year of the policy period. For example, an improvement program may consist of work force reassignments, process re-designs, installation of advanced process controls, and energy efficiency capital projects. However, this invention is not so limited. As a further example, it also applies to other methods capable of quantifying the total net annual savings risk of potentially several hundred initiatives. These risk distributions quantify the probability of exceeding a given net annual savings value and serve as the fundamental input files, data, or equations according to the present invention. The present invention enables underwriters to apply similar procedures they would perform in standard insurance situations even though the nature of the insured risk is unique.

According to the present invention, "Savings" can be tangible or intangible and include but are not limited to increased revenue; reduced operational expenses maintenance expenses and capital expenditures; increased production through-put; reduced energy consumption; reduced emissions; increased emission credits; etc. These savings will produce additional benefits to the client in the form of enhanced creditworthiness and resulting increased availability of financing and reduced cost of financing. One skilled in the art will recognize that the present invention can generate other savings and benefits not articulated in the lists above.

The aggregate risk distributions are defined for each location on a similar basis as that applied to develop property insurance. Underwriting may be first performed at a location level and then viewed at the client level. One novel part of this invention is to enable the underwriter to develop pricing at either level. At the location level, the aggregate risk distributions are formed for the subset of all initiatives designed to be implemented at the location. At the client level, the aggregation produces only one aggregate risk distribution per year or other time periods.

If location level pricing is desired, then according to the present invention, aggregate risk distributions are applied at each location and the client level premium may be equal to the summation of the location level premiums. Some premium components may appear only at the client level, such as profit, tax, and commissions, but the system and method according to the present invention contains the flexibility to include all pricing elements in either version of the application of this insurance pricing system.

While the invention is generally discussed from the perspective of either pricing a single location or pricing at a single client level, a multi-client pricing system is also within the scope of the present invention. Multi-client as used herein includes but is not limited to an investor(s) in one or more facilities, for example power, refining, chemical, manufacturing facilities, etc. in any permutation or combination of ownership and/or geography.

BRIEF DESCRIPTION OF THE DRAWINGS

A better understanding of the present invention can be obtained when the following detailed description of the preferred embodiment is considered in conjunction with the following drawings, in which:

FIG. 7A is a spreadsheet of an embodiment of the claimed product, system and method.

FIG. 7B is a spreadsheet of an embodiment of the claimed product, system and method.

FIG. 8A is a table of an embodiment of the claimed product, system and method.

FIG. 8B is a chart of an embodiment of the claimed product, system and method.

FIGS. 12A-12D are tables of an embodiment of the claimed product, system and method.

DETAILED DESCRIPTION OF PREFERRED EMBODIMENTS

Figure 2:
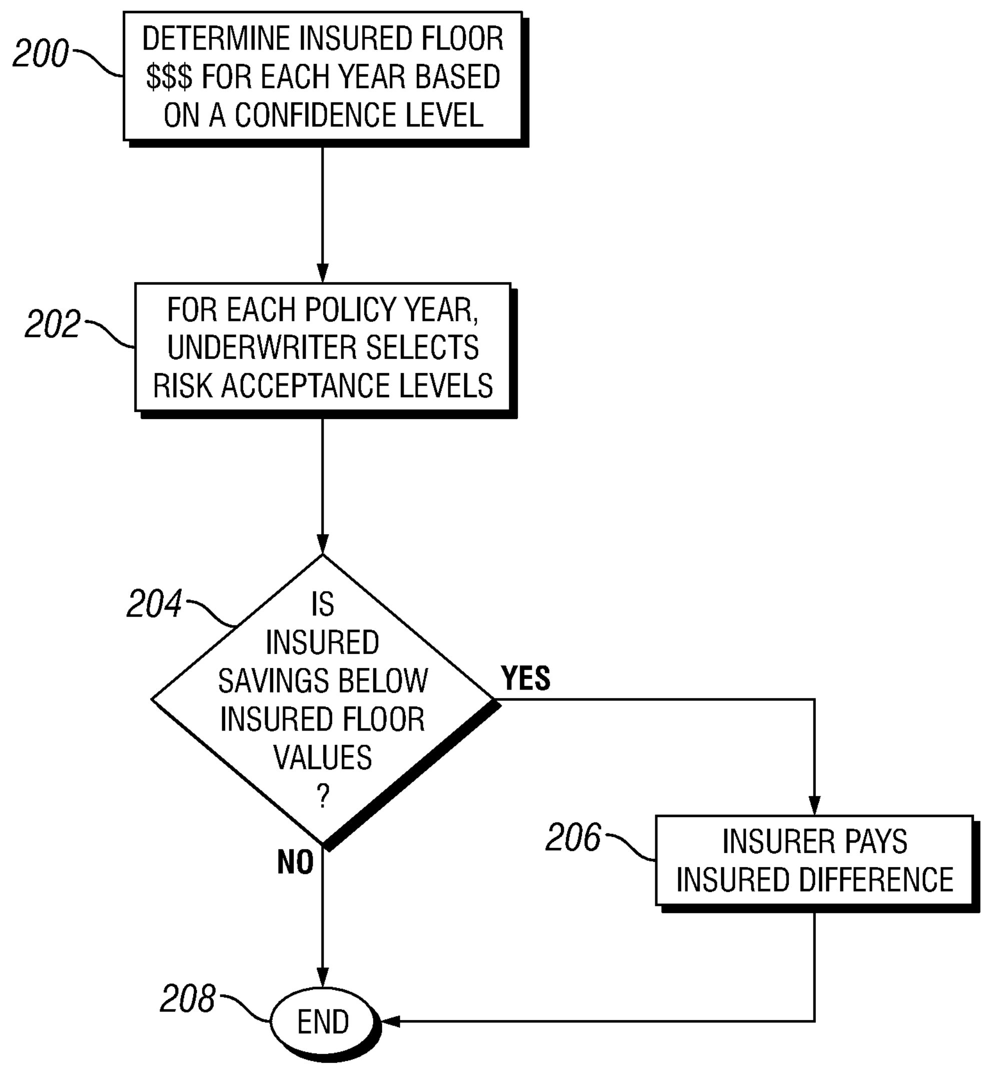
FIG. 2 is a flowchart of an embodiment of the claimed product, system and method.

The underwriter first determines the insured floor dollar values for each year as shown in step 200 in FIG. 2. This may be performed by specifying a confidence level that is used to return the indicated or computed minimum insured savings values for all years or confidence levels and can be applied on a year by year basis. Selecting insured floors by first specifying an explicit confidence level is one unique characteristic of this invention. For this invention, "confidence level" is defined as the probability that the annual savings will exceed the insured floor value. Performing this function is called risk acceptance. For each policy year, the underwriters select the risk acceptance level they believe represent insurable positions under the terms and conditions of the policy at step 202. The insured floors are also called risk acceptance thresholds in that if the insured's annual Savings results are below these values and the insured is in compliance with the terms and conditions of the policy, the insurer would pay the insured the difference between the actual achieved results and the insured floor value at steps 204 and 206, respectively. Under the insurance policy, the insurer is accepting the risk of paying up to the risk acceptance threshold dollar amount each year.

Figure 3:
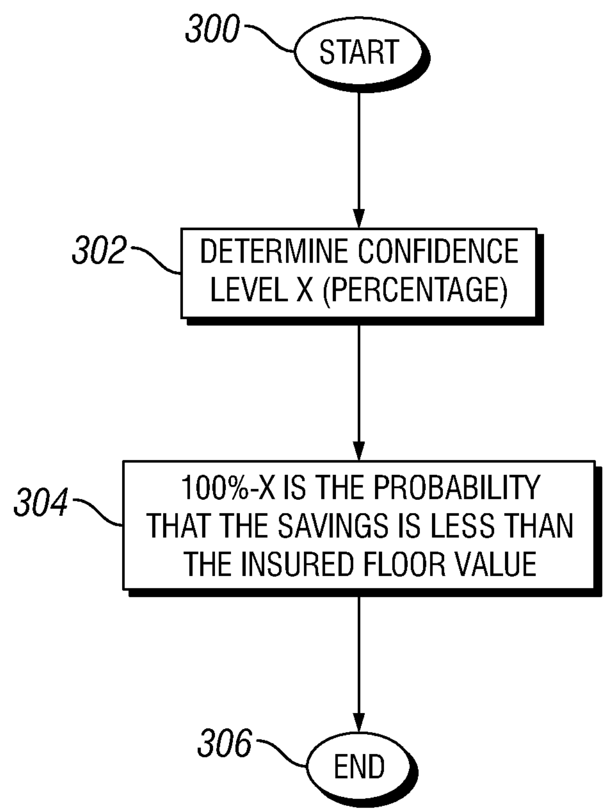
FIG. 3 is a flowchart of an embodiment of the claimed product, system and method.

These risk acceptance values are also related to claim frequency as depicted in FIG. 3. The method starts at step 300 where a confidence level percentage is determined at step 302. The difference between 100 percent and the confidence level percentage constitutes the probability that the Savings may be less than the risk acceptance value at step 304. For example, a 90% confidence level indicates that 10% of the time, the Savings is expected to be less than the indicated acceptance value. While additional claim frequency mitigation elements are applied in this invention, the 100 minus confidence level may be an upper limit on the expected annual claim frequency.

Another unique characteristic of this invention is to use the confidence level approach to enable underwriters to apply different risk acceptance judgments for different policy years. This may be but one major advantage of setting deductibles by confidence level rather than directly in terms of absolute dollar values. However, underwriters can choose a risk acceptance value directly and apply the input annual aggregate risk distributions to determine the corresponding risk acceptance confidence level. Both methods are included in this invention. Also the application of input annual aggregate risk distributions to help specify multi-year deductibles is a unique part of this invention.

The flexibility of specifying yearly or overall confidence values enable underwriters to set risk acceptance values higher for years they believe there is higher risk and lower amounts when the risk is within normal tolerances. This can occur if the underwriters believe that the insured's implementation and scheduling plan will not either meet the expected Savings targets or that the project schedule is too aggressive implying that the insured's Savings will be achieved but not in the policy year indicated in the implementation and scheduling plan. This feature gives underwriters the flexibility to adapt their risk acceptance analysis to consider in addition to the insured's engineering performance, the available personnel, project management, and several other key factors.

Figure 4:
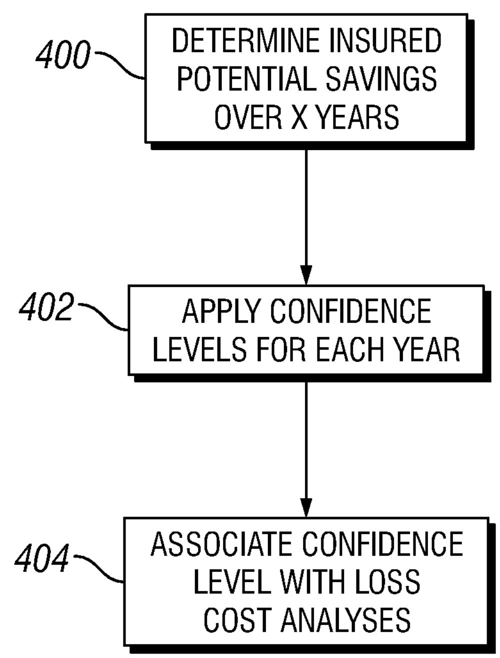
FIG. 4 is a flowchart of an embodiment of the claimed product, system and method.

As an example of how this process can be performed, suppose a potential insured's cumulative Savings engineering project plan forecasts $20M in year 1, $30M in year 2, and $35M in year 3 as depicted in step 400 of FIG. 4. After a detailed review of the implementation and scheduling plan by underwriting, the completion schedule for the year 1 is judged to be too optimistic. Underwriters believe that the Savings as forecast by year 1 will be obtained but some of the initiatives will extend into year 2. For the remaining initiatives, it is further concluded that the Savings targets will be achieved on the time schedule indicated in the implementation and scheduling plan for years 2 and 3.

For this situation underwriters may apply a higher confidence level for year 1 than for years 2 and 3 at step 402. A 95% confidence level could be applied to year 1 with a 90% confidence applied to years 2 and 3. The resulting risk acceptance values may be $10M for year 1, $22M for year 2, and $25M for year 3. It may be expected that the risk acceptance values will be less than the stated engineering forecasts as a matter of proper underwriting, for example, to reduce the potential for moral hazard.

With the risk acceptance values selected, the next underwriting decision is to choose the confidence level associated with the loss cost analysis at step 404. For example if an underwriter chooses a 95% confidence level, the corresponding loss costs actually experienced should be less than this value 95% of the time. A unique characteristic of this invention is the capability of the underwriter to select a loss cost confidence level by year or, by default, use the same value for all years.

Another unique characteristic of this invention is the ability to apply different savings measurement criteria as claim triggers. One embodiment of the invention contains two types of savings measurement criteria although a combination or other methods could be applied.

The underwriter selects the measurement method and for this example of the invention, the methods are Escrow or No Escrow. The Escrow approach accumulates the excess above the risk acceptance values, if any, in the Savings over the policy years. If there is a shortfall in a policy year, the Escrow account may be debited first. A claim occurs when the Escrow account is zero and a yearly savings target is not achieved. The No Escrow method simple compares the actually achieved value, A, to insured Savings value, B, and a claim for the dollar difference $B−A occurs if A<B.

While the underwriter selects the measurement method in the system, it is not necessarily an input that is determined by the underwriting function. The claim measurement method may be identified as part of the policy and may be agreed to by the insured, insurer, and other interested parties such as investment firms, banks, or rating agencies (e.g., Standards & Poor).

Figure 5A:
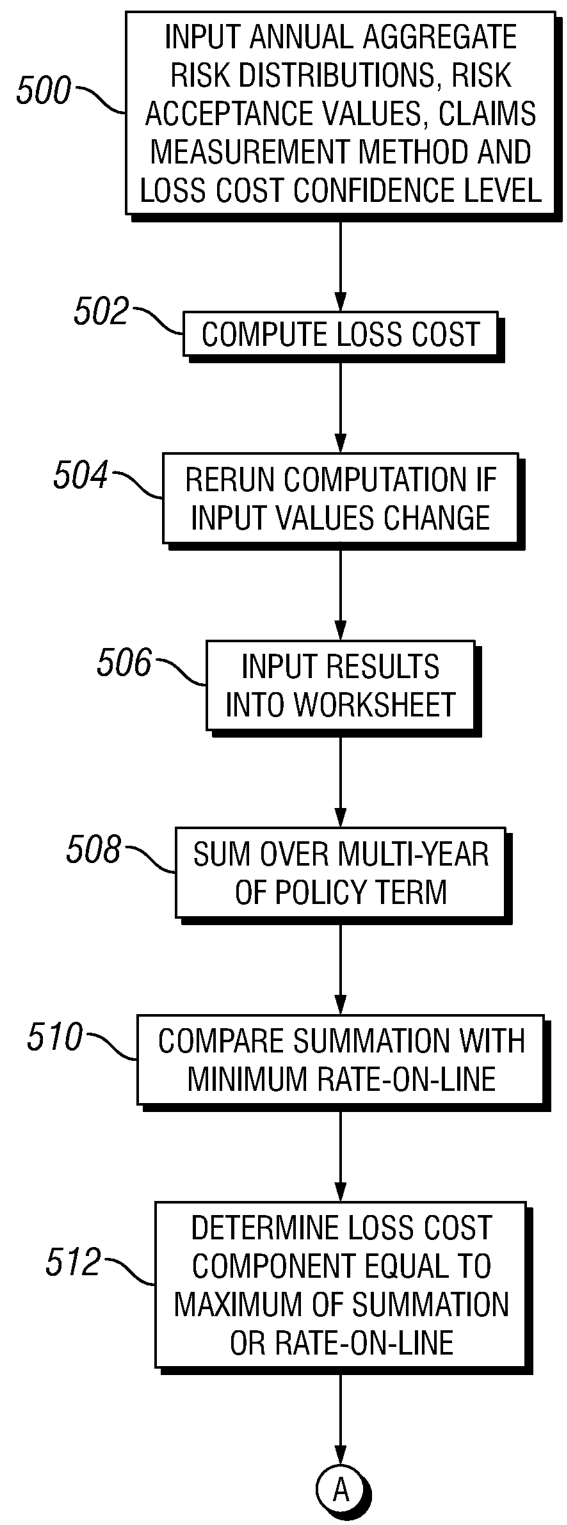
FIG. 5A is a flowchart of an embodiment of the claimed product, system and method.
Figure 5B:
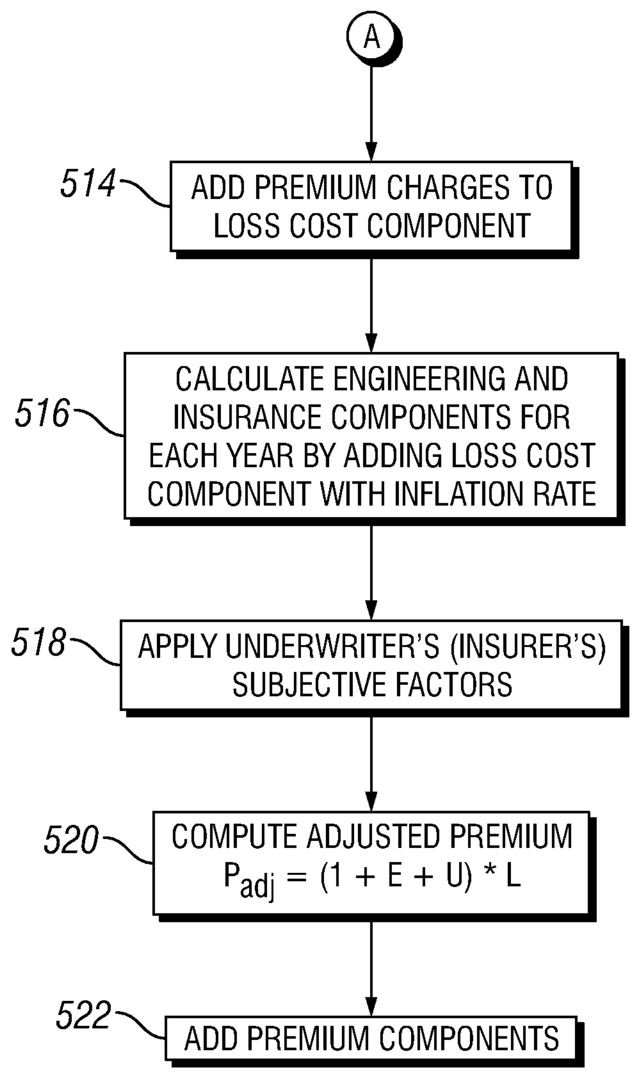
FIG. 5B is a flowchart of an embodiment of the claimed product, system and method.

At this point, FIGS. 5A and 5B illustrate the system for computing loss costs using a stochastic model that utilized the input annual aggregate risk distributions, risk acceptance values, the claims measurement method, and the required loss cost confidence level shown at steps 500 and 502. This is a dynamic system where at any one of these inputs change, the stochastic model is re-run at step 504. This combination of these policy-specific attributes and risk data to produce loss costs is a unique characteristic of this invention.

At the completion of the stochastic analysis which may require several thousands of different samples to accumulate the sufficient loss cost distributions, the loss costs at the underwriter specified levels is automatically placed into the pricing worksheet at step 506. The values are summed over the years of the policy term (e.g., over a range of one to seven years) at step 508 and compared with a company-specific requirement of a minimum rate-on-line at step 510. Rate-on-line is defined as the loss costs (or premium) divided by the total dollar exposure to the insurer. For example, a 5% rate-on-line requirement for a $1M total exposure produced a premium result of $50,000. The maximum of these two numbers: the sum of the loss cost values from the stochastic model and the rate-on-line estimated premium, is entered as the loss cost component of the multi-year policy premium at step 512.

With the loss costs determined, the underwriter adds premium charges that are due to the engineering and underwriting fees that will be required to administrate the policy over the policy term at step 514. These expenses include for example, on-site engineering review of work practices, initiative implementation progress, and the Savings measurement and verification procedures. These activities will generally vary according to the type of industry, facility location, policy term, policy conditions, and with several other factors. It is noted that the premium reflects the true costs of policy administration as well as the potential costs involved with actual losses. These costs are entered individually for each policy year, inflated using a supplied annual inflation rate, and summed to produce the overall engineering and underwriting (insurance) components at step 516. These costs are mostly well defined expenses and are not typically risk-based nor do they possess a significant stochastic component. At this point in the premium development, these charges are placed into the year and category (Underwriting or Engineering). Additional analysis of factors that influence the loss cost premium component is generally required before the expense items can be used further.

Along with the quantitative aspects of underwriting and premium development, there are subjective factors that are designed to utilize the underwriter's intuition and experience to modify, if desired, the computed loss cost premium at step 518. These factors can increase or decrease the loss cost component within prescribed percentage ranges. To facilitate the underwriter's use of these subjective factors, they are divided into engineering and underwriting categories. The actual list of risk modification factors and ranges will vary between industries and clients but they may include some of the items listed below.

A credit is interpreted as enhancing risk quality which then translates into a decrease the loss costs. A debit is configured as a decrease in risk quality which increases the loss cost component of the policy premium.

Engineering Quality Underwriting: [Debits, Credits]

1) Organization/Culture: [+15%, −10%] Risk exposures, hazards, and human behaviors are inter-connected. A company's safety, environmental, reliability policies and basic cultural risk acceptance attitudes are important attributes for inferring how the corporation and its employees will routinely mitigate risk and also respond to accidents 2) New Technology Applications: [+10%, −10%] Depending on the robustness of the new technology design, the operational and short term financial advantages can be offset by a decrease on reliability and availability in the long term. These factors need to be considered by the underwriter in this multiyear type of insurance policy which is intended to insure a minimum performance or Savings level.

3) Management Motivation: [+15%, −10%]. The underwriter needs to understand how the company's management intends to leverage the financial applications of the overall implementation and scheduling plan. The multi-year program will require the long term commitment of management and the financial applications of the program will provide the underwriter valuable insights to judge the Savings sustainability.

4) Supervisor Motivation: [+15%, −10%] The underwriting risk assessment for facility supervisors may be similar to what may be required for management. At the employee-level, supervisors need to be committed to the implementation and scheduling plan's success and to its sustainability over the multi-year policy term. One way for the underwriter to assess supervisor (and management) commitment may be to determine how the execution of the Savings implementation and scheduling plan is connected to the employee bonus program.

5) Complexity: [+10%, −10%] Complexity refers to the difficulty of program execution. Some of the issues to be considered in this evaluation are initiative technical difficulty, volumetric inter-dependence, and schedule inter-dependence.

6) Housekeeping and Recordkeeping: [+5, −5%] The cleanliness, arrangement, and organization of the insured's assets are valuable, observable indicators to infer employee reliability and safety awareness. Many studies have shown a strong productivity and reliability correlations to facility and asset cleanliness and organization. This characteristic may be easy to observe and inference to improved reliability may be a factor in the engineering aspects of policy underwriting. Also the level and accuracy of production and operational recordkeeping may be another visible indication of employees' and management's commitment to procedure compliance and attention to detail that also reflects the engineering risk quality of the insured's facilities.

Overall the summation of the debits and credits of one embodiment is generally limited to a total of a 20% credit (premium decrease) or a 25% debit (premium increase.)

Underwriting quality refers to the terms and conditions of the insurance policy that are negotiated given the operational and engineering conditions of the implementation and scheduling plan. These risk modification factors measure risk quality from a written contractual, rather than technical, perspective.

The credit and debit assignments follow the same convention as with the engineering risk modification factors. A credit is interpreted as enhancing risk quality which then translates into a loss cost reduction. A debit is configured as a decrease in risk quality which is expressed as an increase the loss cost component of the policy premium.

Underwriting Quality Underwriting: [Debits, Credits]

1) Exclusions: [+10%, −10%] These policy terms refer to events for which the insurance policy would not respond to Savings achievement levels below the insured minimum. These events include, war, worker strikes, weather events, events covered under other insurances, failure of the insured to comply with policy conditions, and contractor performance errors.

2) Self Insured Retention/Deductibles: (+10%, −10%] The self insured retention or deductibles determine the insured's total financial risk exposure. If the insured is willing to assume higher annual Savings levels, then the risk quality from an underwriting perspective can be increased since the insured accepts a larger annual Savings shortfall before the insurance policy would respond.

3) Savings Measurement & Verification: [+15%, −10%] The type of Savings and the procedures for measurement verification are fundamental to insurance underwriting. These factors are essential to determine initiative implementation quality both in time and volumetric savings achievement. There are, however, different ways these functions can be accomplished. For example, the measurement and verification can be performed by the insured and audited by the insurer, or a third party can be charged with these tasks. Involving the insured in these actions can be problematic and provide a moral hazard if insufficient oversight is not maintained. Savings measurement and verification can also provide a proactive indication of initiatives which are behind implementation targets. The underwriter needs to assess the type of measurements being taken to measure the Savings, the frequency of measurement, the ability to access this data trending, and the propensity to obfuscate actual initiative performance.

Overall the summation of the debits and credits are limited to a total of a 20% credit (premium decrease) or a 25% debit (premium increase.)

The aforementioned factors are routinely applied in policy underwriting and premium development depending on the type of insurance, life, casualty, property, etc. and also on the nature of the insured's business. The actual number and type of Engineering and Underwriting risk modification factors will vary depending on the type and nature of asset performance under policy consideration.

The "Adjusted Premium" is now computed at step 520. This term is defined as the aggregate policy term loss costs multiplied by the Engineering and Underwriting risk modification factors. If E=the aggregate engineering risk modification factor, U=the aggregate underwriting risk modification factor, and L the loss costs, then the adjusted premium, $P_{adj}$ is determined by $$P_{adj}=(1+E+U)*L$$

The final stage of the premium development is to add premium components associated with insurance pricing elements at step 522. These items typically include engineering & administrative expenses, profit, reinsurance costs, taxes and commissions.

There are several variations and combinations of these factors that can be applied to the insurance product, rating system and method. The most notable variation may be the decision on how to account for the engineering expenses. Some insurance policies of the present invention may include all engineering fees in the policy premium and some may exclude the charges from the policy premium and charge these fees as consulting expenses independent of the insurance policy.

As an example of how the insurance policy pricing according to the present invention is performed, the following example shows premium development according to the present invention for a three year policy where engineering fees are incorporated into the premium calculation and is used to develop the loss costs.

Figure 6A:
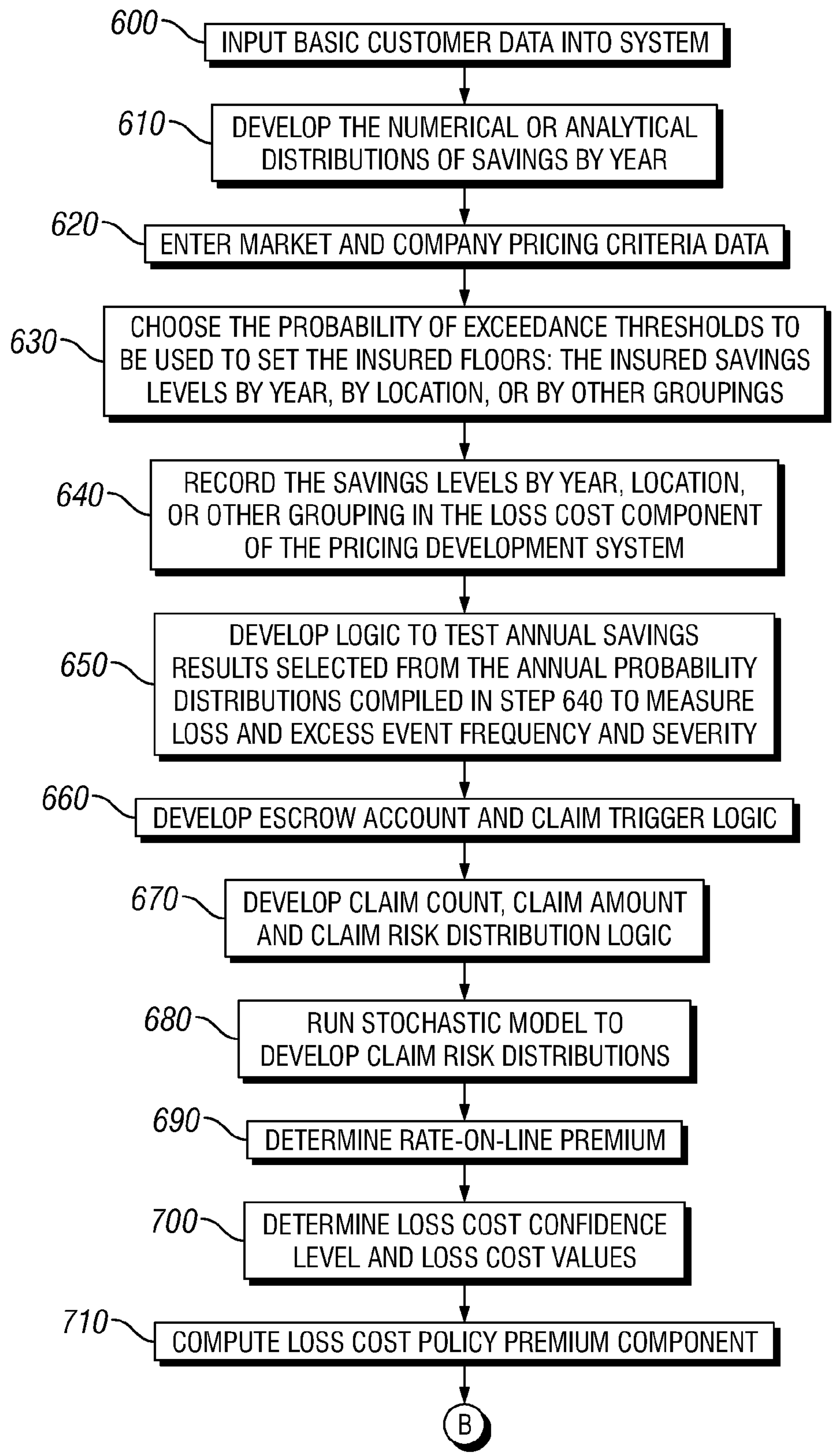
FIG. 6A is a flowchart of an embodiment of the claimed product, system and method.
Figure 6B:
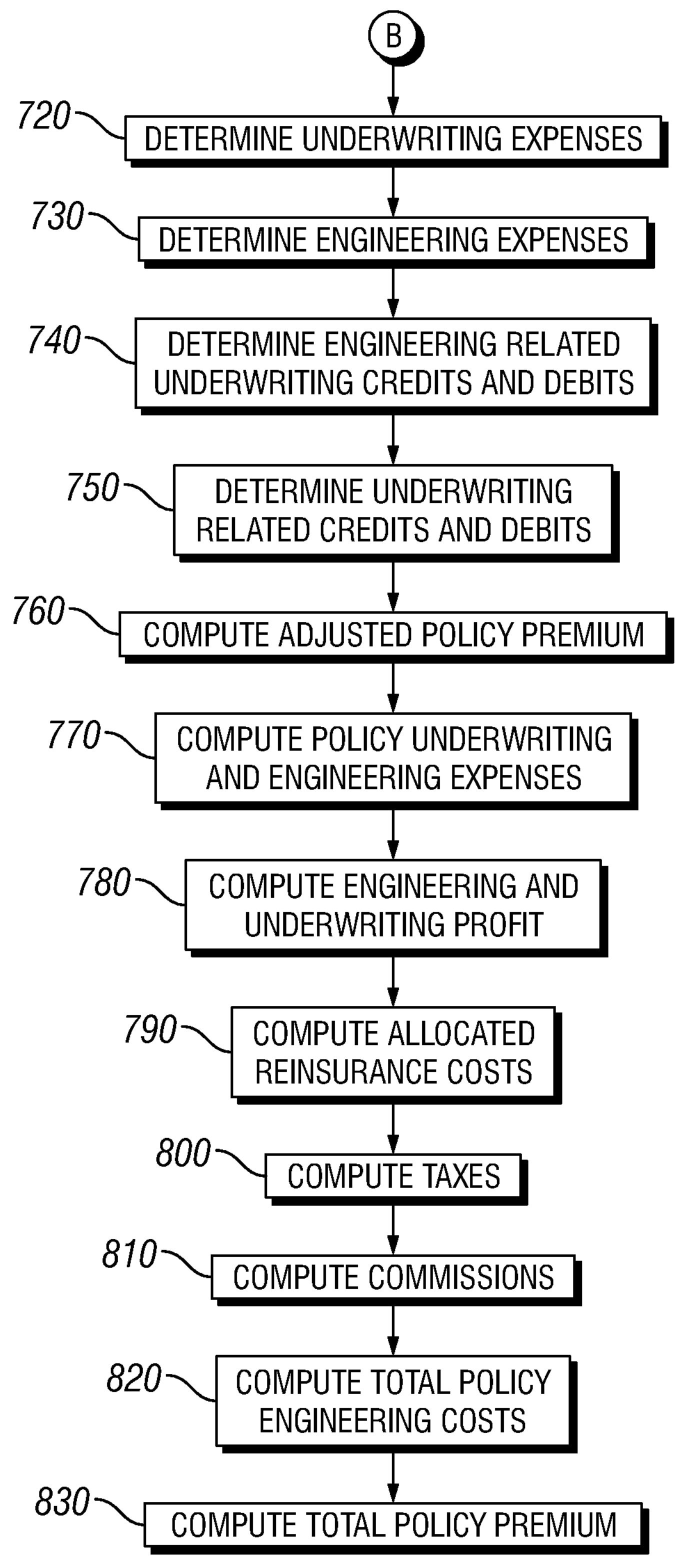
FIG. 6B is a flowchart of an embodiment of the claimed product, system and method.

An embodiment of the overall claimed subject matter follows in FIGS. 6A and 6B.

600 Input Basic Client Data into System. At step 600, the user enters: Insured Name, Lending Institution, Country & Region, Addresses of Covered Locations, Occupancy, Location Size in Production Output Metrics, and Application of Insured Savings. This basic data can be integrated with a client database so that other key variables required by the system can be automatically identified from this basic data.

610 Develop the Numerical or Analytical Distributions of Savings by Year. At this step an overall annual probability distributions are compiled and placed in a format so they can be accessed dynamically. The distributions describe the probability of exceeding annual Savings vs. the savings values. The distributions can be taken by analytical methods designed to compute aggregate Savings exceedance probabilities. There is a separate distribution for each location, plant, unit, or other segment under analysis for each year. These distributions are composed of Savings values and the corresponding probability of exceeding these values.

620 Enter Market and Company Pricing Criteria Data. At this step, the inflation rate that is representative for the policy period and the minimum and maximum rate-on-line company-specified criteria are entered into the system.

630 Choose the Probability of Exceedance Thresholds to be Used to Set the Insured Floors: the Insured Savings Levels by Year, by Location, or by Other Groupings. At this step the amount of risk that the insurer is willing to accept is determined by setting the exceedance probability threshold for coverage. There are two ways this can be done, the user can choose a probability of exceedance for all years or a different value for each year depending on the underwriting information. The probabilities are matched in the probability distributions compiled on step 610 and the corresponding Savings values are identified. For example, suppose the insurer is willing to accept an exceedance probability (measured in percentage) of 90% for a given location for a given year. This value is matched to the appropriate probability distribution discussed in step 610 and the corresponding Savings value is found to be $15M. This means there is a 90% chance that the location's annual savings that year will be greater than $15M. An insurance claim may be triggered if the annual savings achieved is less than the $15M value.

640 Record the Savings Levels by Year, Location, or Other Grouping in the Loss Cost Component of the Pricing Development System. At this step, the resulting Savings values that are calculated or accessed from the probability distributions compiled in step 610, are entered into the loss cost component of the pricing system. These values are the resulting insured levels that correspond to the probability of exceedance values entered into the system in step 630.

650 Develop Logic to Test Annual Savings Results Selected from the Annual Probability Distributions Compiled in Step 610 to Measure Loss and Excess Event Frequency and Severity. At this step for each year or other grouping, the logic is developed to compare a sampled distribution Savings value from the probability distributions compiled in step 610 to the recorded values savings floor Savings values. If the sampled Savings value is greater than the inured floor, then an excess is produced for that year. If the value is less than the insured level as given in step 640, then a loss event is produced for that year.

660 Develop Escrow Account and Claim Trigger Logic. At this step, the comparison logic developed to accumulate the total or a fraction of the Savings results that are in excess of the insured savings values. For example, in one year if the computed Savings is $50 and the insured floor is $40, $10 would be credited to the escrow account. On the other hand, if the computed Savings was $35, then first the Escrow account would be debited $5 to obtain the insured level. If the escrow account contained insufficient funds then an insurance claim would be triggered for the difference between the insured level and the sum of the actual Savings results and any funds able to be drawn from the escrow account.

670 Develop Claim Count, Claim Amount and Claim Risk Distribution Logic. At this step, logic is developed to accumulate the number and financial amount of claims for both the escrow and no escrow accounting methods. The financial amount of the claims is called the loss costs. This information is used to compute numerical distributions for the cumulative probability of loss as a function of the loss amount. These distributions are called claim risk distributions.

680 Run Stochastic Model to Develop Claim Risk Distributions. At the step, a numerical procedure is applied using commercial software or specialized programming that applies steps 640, 650, and 660 to accumulate sufficient loss data to develop a numerical distribution of the probability of loss as a function of the loss amount for both the escrow and no escrow accounting approaches.

690 Determine Rate-on-Line Premium. At this step, the prescribed rate-on-line criteria selected in step 620 is applied to each annual exceedance threshold selected in step 640. The rate-on-line premium calculation may be performed by multiplying the exceedance threshold, the insured Savings minimum, or floor by the decimal value of the rate-on-line. For example, if the insured floor is $10,000 and the rate-on-line is 10%, then the premium requirement is $10,000*0.10 or $1,000. These calculations are applied to each insured annual savings floor as computed in step 640. The results are summed and placed in a Term of Loss Cost Summary Section of the system.

700 Determine Loss Cost Confidence Level and Loss Cost Values. At this step the underwriter enters the likelihood requirement, in percent, that the loss costs obtained from the system will be actually less than the identified values. These percentages are then applied to the claim risk cumulative distributions for each year to determine corresponding value for the yearly loss costs contribution to the total multi-year premium. The resultant values are placed in the yearly loss cost fields. This is performed for the claim risk distributions with and without escrow accounting.

710 Compute Loss Cost Policy Premium Component. At this step, the rate-on-line premium values for each year are summed to compute the total policy premium via the rate-on-line method. Next, the annual loss costs determined in step 680 are summed over the policy years for the Escrow and No Escrow pricing methods. The system user then selects which Escrow pricing method may be required for the client. The system subsequently computes the policy loss cost premium component as the maximum of (1) prescribed rate-on-line, and (2) the summed loss costs via the Escrow method selected.

720 Determine Underwriting Expenses. At this step, the company expenses, required to perform the underwriting analysis and risk surveillance are entered. These costs are incurred in reviewing monthly, quarterly, and yearly Savings reports and periodically meeting with client management at the client sites. The underwriters' responsibility is to ensure the client is meeting their contractual responsibilities and the Savings targets. If the client is in compliance then coverage continues as defined in the policy. If the client is not in compliance, then it is the underwriters' responsibility to notify company engineering and notify client management, in writing. If compliance with engineering recommendations and other policy conditions are not met in the time constraints as specified in the policy, then the underwriters have the responsibility and the authority to terminate insurance coverage. The expenses incurred performing these activities are entered into the system for each policy year.

730 Determine Engineering Expenses. At this step the technical engineering, project management, and Savings oversight activities are reviewed for compiling their associated policy expense costs. Engineering activities provides technical data to support underwriting activities, provides periodic loss prevention and Savings reporting, provides technical directions for initiative implementation, and serves as the on-site liaison between the insurer and the insured. The expenses incurred performing these activities are entered into the system for each policy year.

740 Determine Engineering Related Underwriting Credits and Debits. At this step, pricing modification factors are determined that increase or decrease the premium based on engineering related attributes of the Savings implementation insured values as selected in step 620. These factors include, but are not limited to, the insured's organization and business culture, new technology applications, management motivation to achieve the Savings targets, supervisor motivation, and plant complexity. The range of the modifiers will vary with application but generally are 10% for each factor with an aggregate factor of no less than −20% and no greater than +25%. The engineering risk modification factors are entered into the system for each policy year and an aggregate modification factor is computed.

750 Determine Underwriting Related Credits and Debits. At this step, the pricing modification factors are determined that increase or decrease the premium based on the underwriting related attributes of the Savings insured values as selected in step 620. These risk modification factors include, but are not limited to, policy exclusions that are in place, the insured self insured retention, deductibles, limits, and the Savings measurement and verification program quality. The range of the modifiers will vary with application but generally are 10% for each factor with an aggregate factor of no less than −20% and no greater than +25%. The underwriting premium modification factors are entered into the system for each policy year and an aggregate modification factor is computed.

760 Compute Adjusted Policy Premium. At this step, the numerical results determined in previous steps are combined to produce the basic policy premium. There are several versions or combinations of the steps outlined in this procedure that are claims. An example of one such embodiment is:

Adjusted Policy Premium=Step 710 (Loss Cost Policy Premium)*[1+Step 740 Engineering Modification Factors)+Step 750 Underwriting Modification Factors)]. This result is stored in the Premium: Insurance Adjusted Premium Section of the system.

770 Compute Policy Underwriting and Engineering Expenses. At this step the underwriting expenses determined in step 720 and the engineering expenses determined in step 730 are inflated using the inflation rate entered into the system in step 620 over the policy term and summed to compute the total policy level underwriting and engineering expenses. These results are stored in the Premium: Insurance and Engineering Expense Sections of the system.

780 Compute Engineering and Underwriting Profit. At this step, company-specific guidelines are applied to compute insurance and engineering profit based on the expenses computed in steps 760 and 770. These results are stored in the Premium: Profit-Insurance and Engineering Sections.

790 Compute Allocated Reinsurance Costs. At this step, reinsurance costs, whether facultative or treaty related, are entered into the Reinsurance section of the system.

800 Compute Taxes. At this step, taxes are computed on the pertinent sections of the Premium Section of the system and entered in the system in the Premium-Insurance and Premium and Engineering: Taxes Section.

810 Compute Commissions. At this step insurance related commissions are computed on the pertinent sections of the Premium Section of the system and entered in the system in the Premium-Insurance: Commissions Section.

820 Compute Total Policy Engineering Costs. At this step, all premium costs entered into the Premium-Engineering related sections are summed to compute the total policy engineering costs.

830 Compute Total Policy Premium. At this step, all premium costs entered into the Premium-Insurance related sections are summed to compute the total policy premium. Also, based on the policy requirements and the pertinent accounting procedures, the total policy premium can also include the total engineering costs. In this scenario, all risk transfer and direct engineering costs required to support the policy are included in the total policy premium which is divided by the policy term to determine the annual premium. Depending on the insurance conditions, the insured may pay the whole premium at the beginning of the policy term or pay on an annualized basis.

FIGS. 7A and 7B depicts a spreadsheet encompassing the steps disclosed in FIG. 6.

Figure 1:
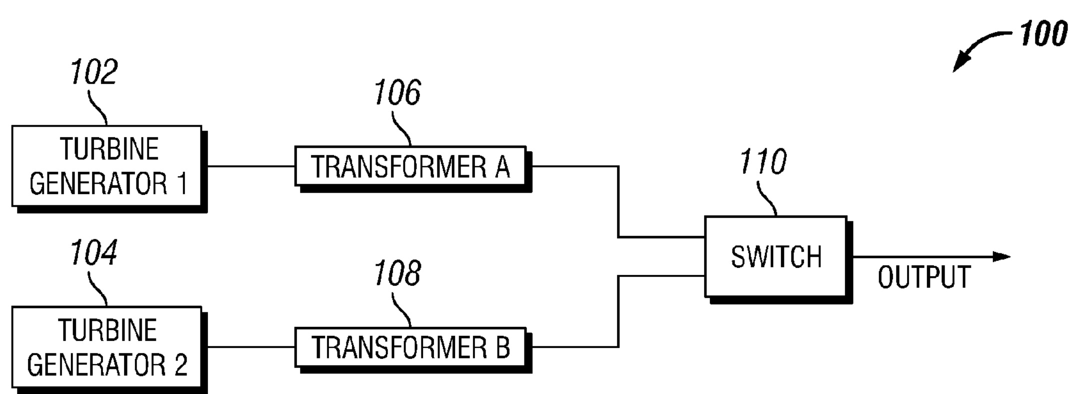
FIG. 1 is a block diagram of a power generation station.

The methods disclosed above can be used to ascertain a securitization rating VB and FS ratings can be based on benchmark data for a particular asset, e.g. the power generation station of FIG. 1.

Figure 8:
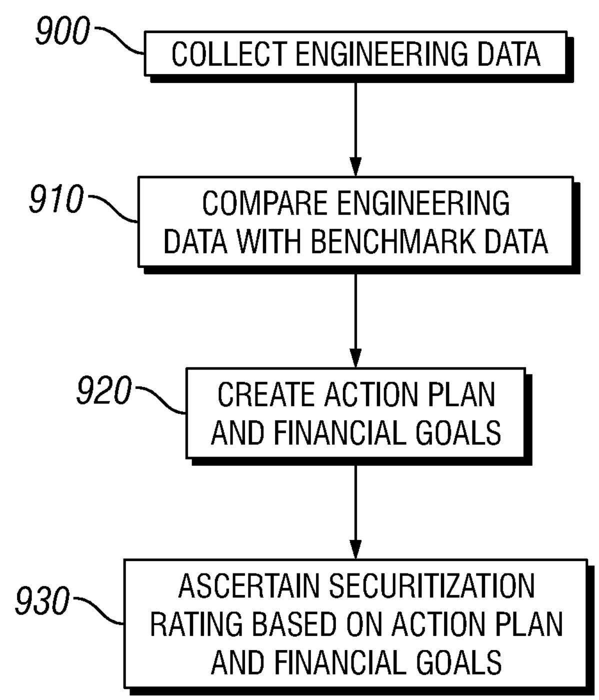
FIG. 8 is a flowchart of an embodiment of the claimed product, system and method.
Figure 8C:
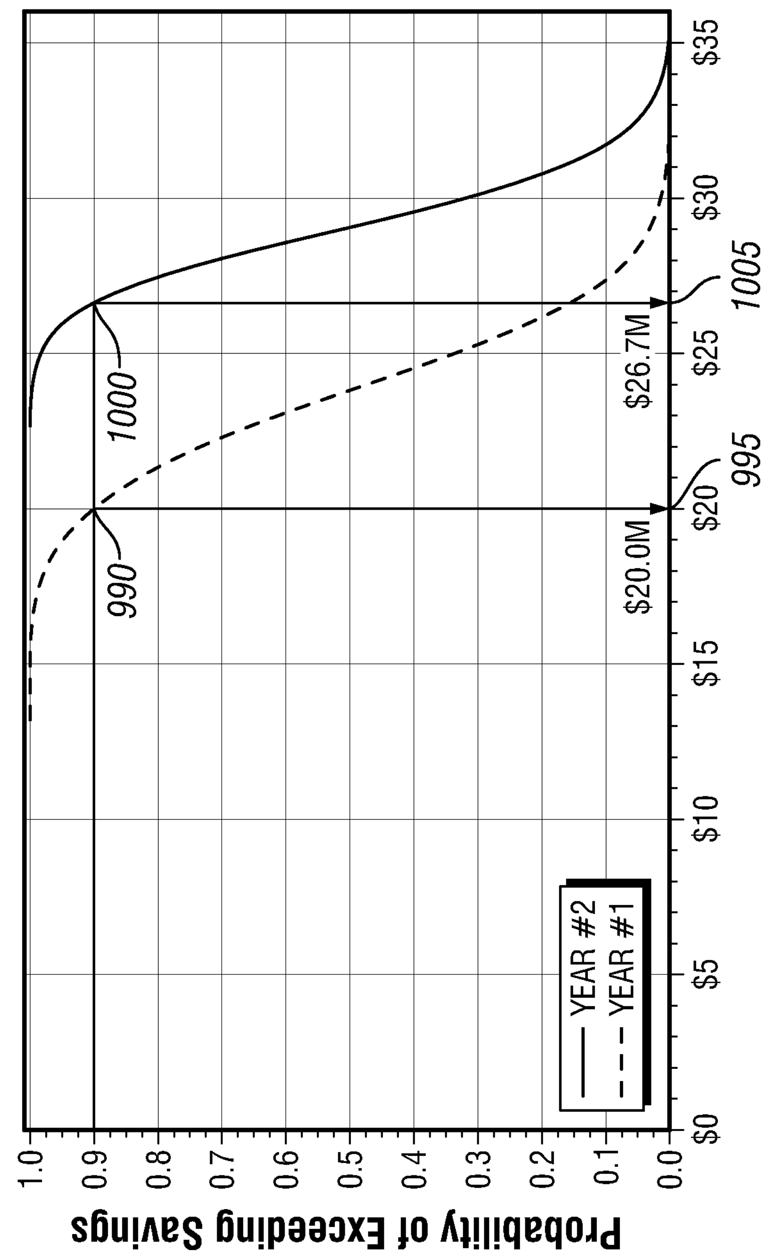
FIG. 8C is a chart of an embodiment of the claimed product, system and method.

For example, FIG. 8 illustrates such method. Engineering data such as improving yields 940 or other initiatives 950, both depicted in FIG. 8A is collected for each required asset at step 900. The engineering data is compared with benchmark data to create an action plan and financial goals at steps 910 and 920. FIG. 8B illustrates an exemplary action plan while FIG. 8C illustrates the financial goals.

For example, FIG. 8B includes various actions to be initiated by employees 960, such as detailed process evaluation 970 and train operators 980. FIG. 8C shows how the risk curves can be used to select annual insurance levels and also provide information to select financial goals for the improvement program overall. For example, following general insurance company guidelines, a company chooses the 90% exceedance probability and moves horizontally over until we cross the Year #1 risk curve at 990 where at 90% risk acceptance value for insurance purposes is $20M at 995. This typically means there is a 90% chance that the actual result will be greater than $20M. The company can also use these risk curves to set their internal financial goals at more aggressive risk acceptance values. For example, company management may target the 60 or 70% levels for the business unit targets which for year #1 would be a goal between approximately $22-$25M. The same procedure is applied for Year #2. The insurance risk acceptance percentile intersects the risk acceptance curve at 1000 which corresponds to $26.7M NCM annual savings at 1005. This amount would be selected as the insured floor. For the company's internal financial goals, using the 60-70% guidelines as in Year #1, Year #2 company financial goals would be between $28-29$M. A securitization rating can be ascertained based on the action plan and financial goals at step 930 (FIG. 8).

Figure 9:
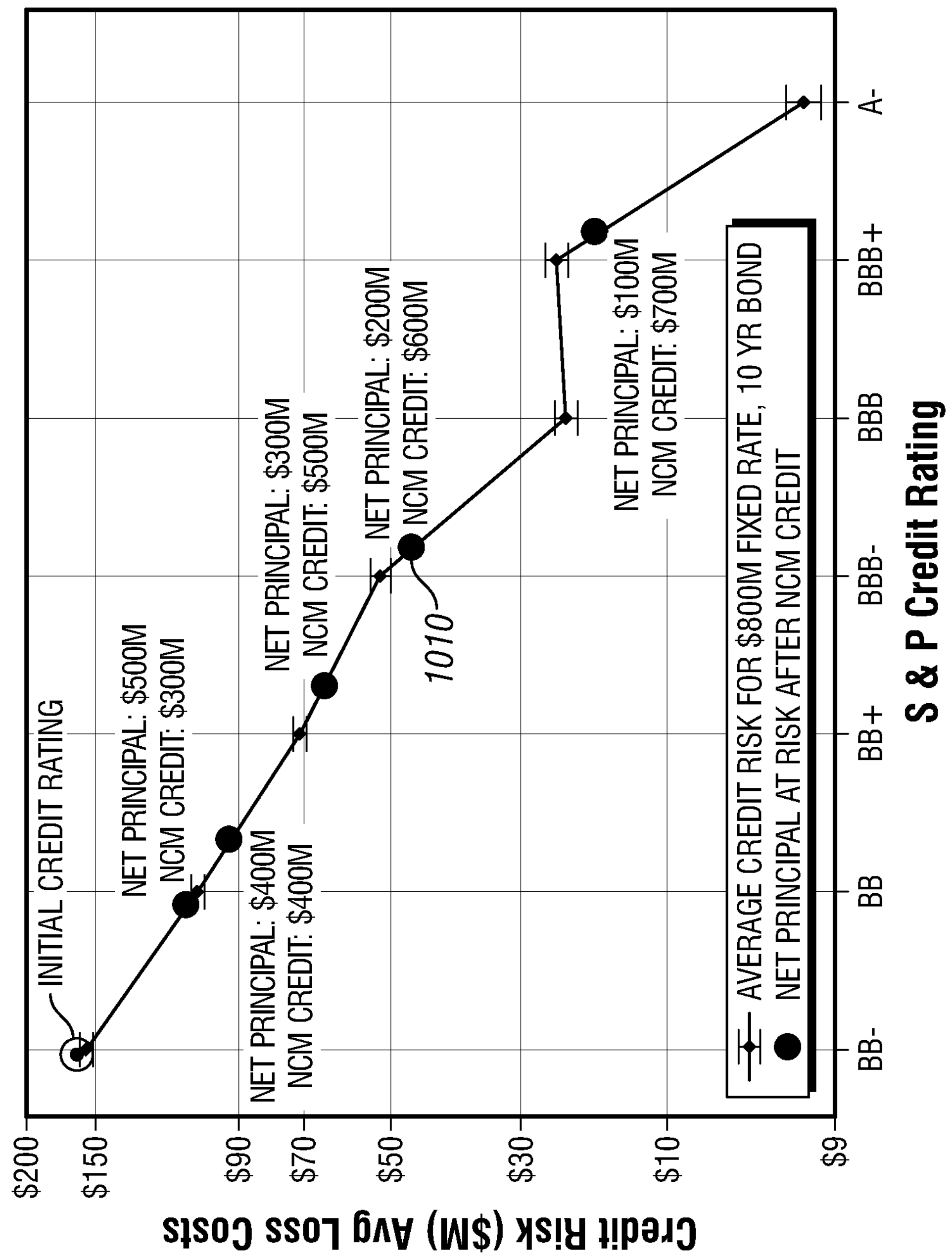
FIG. 9 is a chart of an embodiment of the claimed product, system and method.

Implementation of the present invention may also improve an insured's bond rating. FIG. 9 illustrates cost savings as a result of a reduction of credit risk. For example, suppose improving the operations utilizing the present method can increase the Savings by $700 million of an insured over a ten (10) year period. In the course of developing this company's credit risk for the purpose of developing a bond issue, the lending institution and or credit agency involved may give the company credit for the enhanced operational and financial status by applying the margin benefit to the reduction of the principal at risk. This may be a subjective decision. However, the method applied to this situation offers a risk transfer of principal from the client to the insurer thereby securitizing at least a portion of the principal. Suppose the client has a credit rating of BB− by S & P. A policy utilizing the present invention for this client can have effect to reduce the principal at risk thereby also reducing the transaction's credit risk. Through the risk transfer of this principal to the insurance company, the initial transaction (now at effectively a lower principal) can have an equivalent credit risk of the full bond amount at a higher quality credit rating.

For example, if a client has an $600M policy according to the present invention for over the ten (10) years of a $800M bond, the reduced effective principal at risk ($200) make the transaction appears, from a credit risk perspective as slightly above investment grade, BBB−. This means mathematically the credit risk of a $200 BB− bond may be roughly equivalent to the credit risk of an $800M bond rated at BBB−. This situation illustrated at 1010 in FIG. 9. This example assumes the insurance company's credit rating is at least BBB−.

Figure 10:
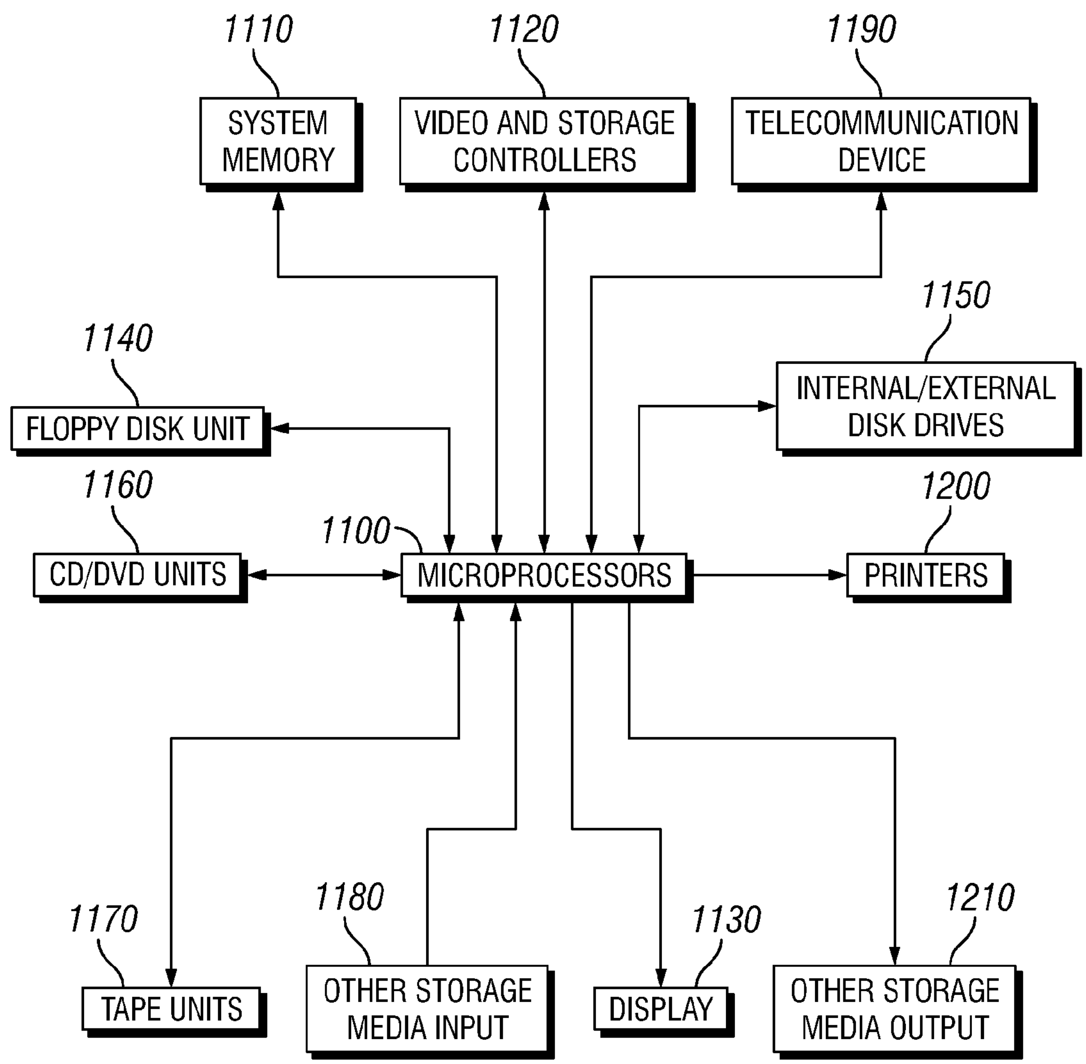
FIG. 10 is a system block diagram of one embodiment of the claimed product, system and method.

Referring to FIG. 10, a computer system used to implement some or all of the method and system is illustrated. The computer system consists of a microprocessor-based system 1100 that contains system memory 1110 to perform the numerical computations. Video and storage controllers 1120 enable the operation of the display 1130, floppy disk units 1140, internal/external disk drives 1150, internal CD/DVDs 1160, tape units 1170, and other types of electronic storage media 1180. These storage media 1180 are used to enter the risk distributions to the system, store the numerical risk results, store the calculation reports, and store the system-produced pricing worksheets. The risk distributions can be entered in spreadsheet formats using, e.g., Microsoft Excel. The risk calculations are generally performed using Monte Carlo simulations either by custom-made programs designed for company-specific system implementations or using commercially available software that is compatible with Excel. The system can also interface with proprietary external storage media 1210 to link with other insurance databases to automatically enter specified fields to the pricing worksheet, such as client name, location address, location size, location occupancy, and risk quality attributes applied in the "Credits and Debits" section. The output devices include telecommunication devices 1190 (e.g., a modem) to transmit pricing worksheets and other system produced reports via an intranet or the Internet to management or other underwriting personnel, printers 1200, and electronic storage media similar to those mentioned as input device 1180 which can be used to store pricing results on proprietary insurance databases or other files and formats.

Figure 11:
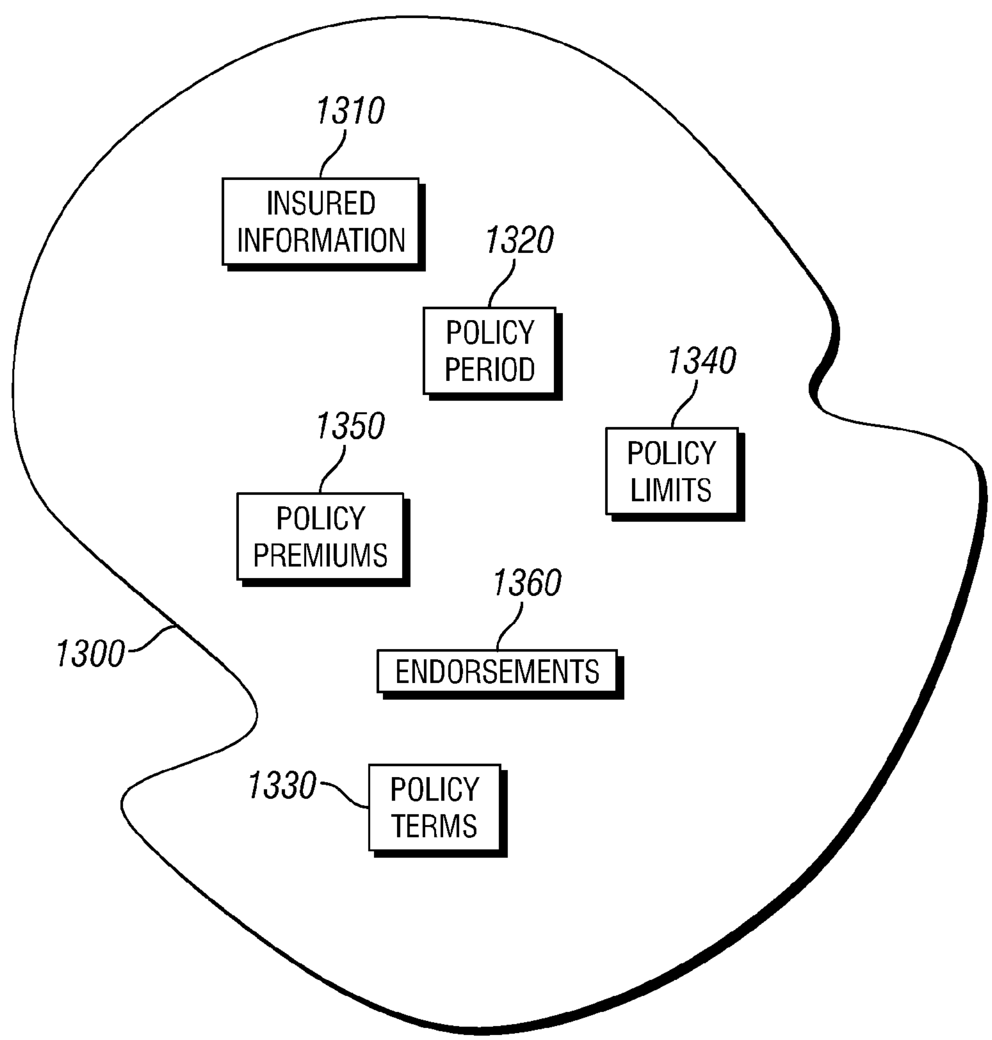
FIG. 11 is a block diagram of an insurance policy according to the claimed product, system and method.

FIG. 11 is a block diagram that depicts the terms and conditions of an insurance policy 1300 according to the present invention. The insurance policy 1300 includes insured information 1310 such as a name of the insured, geographic or physical location(s) of the insured to be covered by the policy. Also included in the policy 1300 is a policy period 1320. The policy period 1320 can be over a single year, multi-year or some other defined period of time. Policy terms 1330, such as savings criteria is included. The savings criteria are generally crafted by a third party company (e.g., HSB Solomon Associates) that uses benchmark information in creating the savings criteria based on the particulars of the insured's business. The savings criteria include processes that if implemented by the insured establishes a sum certain savings to the insured. The third party company can serve as a facilitator in process execution enabling the insured to improve operating performance (resulting in a savings). If the process is implemented and the sum certain savings is not realized by the insured over the policy term (with certain exceptions outlined in the policy), the insurer will pay the insured the difference (referred to as a shortfall). The certain exceptions include, but are not limited to, hostile or warlike action, insurrection, rebellion, civil war, nuclear reaction or radiation, default or insolvency of the insured, vandalism, riot, failure of contractors to implement the processes, modification or alteration to the processes that were not approved by the insurer or other terms outlined in the policy. Other policy terms 1330 include duties of the insurer and duties of the insured such as execution of the processes in a timely manner, cooperation with the third party company, preparation of status reports, permission by others to audit the insured's accounts, performance records and data logs and other matters. Furthermore, if the savings are determined on a yearly basis and the policy is a multi-year policy, and as a result of the insured implantation of the processes, a shortfall occurs, such shortfall could be kept in an escrow account (herein referred to as a surplus account). The escrow could increase or decrease over the multi-year policy. Any surplus at the end of the policy term can be paid to the insured. Other terms can include cancellation terms, representations and warranty, assignment obligations and effects due to the sale or transfer of a covered location.

The policy 1300 also includes monetary policy limits (i.e. limit of liability) 1340 over the time period 1320 and premiums 1350 to be paid by the insured and endorsements 1360. Such endorsements can include market price indexing and operational baselines unique to the insured's industry, the implementation plan and schedule, agreed metric plan, savings calculation procedures and baseline values, debt obligations and additional exclusions, definitions and conditions.

FIGS. 12A-12D illustrate an agreed metric plan. The agreed metric plan provides top level task lists of an implementation plan and schedule. For illustrative purposes, the plan is divided into four sections, namely, initiative 1400, benefits and measurements 1402, implementation 1404, and savings 1406.

For example, in FIGS. 12A, 12B, 12C and 12D, the agreed metric plan pertains to a chemical industry policy. From the implementation plan and schedule, various top level initiatives 1400 are listed in FIG. 12A. For example, some of the initiatives from a chemical industry policy may include movement of an analyzer to trays and modification of regulatory controls on final product columns 1408 for a particular plant 1410 (Initiative #1). The column titled "area" refers to geographical or functional location the initiative, e.g., Plant 1. Another initiative for an insured's site may include the reduction of pressure in a stripper to save energy 1412 (Initiative #2). Furthermore, another initiative for another plant may include the reduction of time to dry catalyst after regeneration 1414 (Initiative #3). Documents or other deliverables 1418 are provided to document the results of the implantation of the initiatives. An example of such a document 1420 may include a report describing the savings achievement as a result of the implantation of initiative #3.

One embodiment of the benefits and measurement section of the agreed metric plan is provided in FIG. 12B. Implementation of the initiative may result in certain benefits that are described in this section. For example, for initiative #1, one benefit 1422 may be a production efficiency improvement. The plan includes various measurement values and methodologies that are directed to the results of the initiative. The values and methodologies may relate to engineering units (e.g., t/h) and time periods (e.g., measurements are done daily and then averaged over a period). Furthermore, the plan includes dates (target and actual) for the commencement of the initiatives and completion dates of the initiatives. The agreed metric plan typically requires the agreement and sign off (e.g., initials of the insured and insurer) 1424 of each initiative and initiative results (i.e., the agreement section).

The plan also includes target and actual dates as shown in FIG. 12C. Each initiative may have a target date of completion 1426, actual date of completion 1428 and the number of days for completion 1430.

The plan also include information regarding the economic Savings 1432 as a result of the implantation of the initiatives. Such information may include target Savings 1434 and actual Savings 1436 achieved as a result of the initiative.

The foregoing disclosure and description of the invention are illustrative and explanatory thereof, and various changes in the details of the illustrated method may be made without departing from the spirit of the invention.

We claim:

1. A system for providing a computer implemented insurance product for insuring an insured's projected savings from an improvement program, the system comprising:

a user interface that receives a risk acceptance value for the improvement program;

a storage unit used to receive and store:

savings criteria for the improvement program;

risk distribution data corresponding to the savings criteria, wherein risk distribution data is compiled from a plurality of projected savings values for the improvement program and the corresponding probabilities of achieving the respective savings values; and the risk acceptance value for the improvement program; and a processor programmed with executable code that when executed, causes the processor to:

determine a confidence level based on the risk acceptance value and the risk distribution data for the improvement plan;

calculate a loss cost premium for insuring the projected savings from implementing the improvement program based on the risk acceptance value, the confidence level, and the risk distribution data; and generate the insurance product comprising the savings criteria.

2. The insurance product of claim 1, wherein the insurance product further comprises endorsements.

3. The insurance product of claim 1, wherein the insurance product further comprises an agreed metric plan.

4. The insurance product of claim 3, wherein the insurance product further comprises the calculated premium, an insuring agreement, exclusions, conditions, duties of an insurer; duties of an insured, disposition of a covered location, a limit of liability, definitions, and a surplus account.

5. The insurance product of claim 1, wherein the insurance product further comprises a savings measurement and loss adjustment.

6. The insurance product of claim 2, wherein the endorsements comprise market price indexing and operational base lines.

7. The insurance product of claim 2, wherein the endorsements comprise a savings execution plan and schedule.

8. The insurance product of claim 2, wherein the endorsements comprise a savings calculation procedure and base line value.

9. The insurance product of claim 2, wherein the endorsements comprise agreed debt obligations of the insured.

10. The insurance product of claim 4, wherein the exclusions comprise at least one of: modifications to the covered location that affect the agreed metric plan and modifications to the agreed metric plan.

11. The insurance product of claim 4, wherein the exclusions comprise a failure of the insured to perform the duties of an insured.

12. The insurance product of claim 4, wherein the exclusions comprise shortfalls resulting from deviations in or related to a base line production.

13. The insurance product of claim 4, wherein the conditions comprise noncompliance with the agreed metric plan.

14. The insurance product of claim 3, wherein the agreed metric plan pertains to an industry.

15. The insurance product of claim 14, wherein the industry is at least one of:

a power industry, a chemical industry, a refining industry, and a manufacturing industry.

16. A non-transitory computer readable storage medium encoded with a computer program for providing an insurance product for insuring an insured's projected savings from an improvement program, the program comprising instructions that when executed by one or more computers cause the one or more computers to perform operations comprising:

receiving a risk acceptance value for the improvement program;

receiving and storing:

savings criteria for the improvement program;

risk distribution data corresponding to the savings criteria, wherein risk distribution data is compiled from a plurality of projected savings values for the improvement program and the corresponding probabilities of achieving the respective savings values; and the risk acceptance value for the improvement program;

determining a confidence level based on the risk acceptance value and the risk distribution data for the improvement plan;

calculating a loss cost premium for insuring the projected savings from implementing the improvement program based on the risk acceptance value, the confidence level, and the risk distribution data; and generating the insurance product comprising the savings criteria.

17. The insurance product of claim 16, wherein the insurance product further comprises endorsements.

18. The insurance product of claim 16, wherein the insurance product further comprises an agreed metric plan.

19. The insurance product of claim 18, wherein the insurance product further comprises the calculated premium, an insuring agreement, exclusions, conditions, duties of an insurer; duties of an insured, disposition of a covered location, a limit of liability, definitions, and a surplus account.

20. The insurance product of claim 16, wherein the insurance product further comprises a savings measurement and loss adjustment.

21. The insurance product of claim 17, wherein the endorsements comprise market price indexing and operational base lines.

22. The insurance product of claim 17, wherein the endorsements comprise a savings execution plan and schedule.

23. The insurance product of claim 17, wherein the endorsements comprise a savings calculation procedure and base line value.

24. The insurance product of claim 17, wherein the endorsements comprise agreed debt obligations of the insured.

25. The insurance product of claim 19, wherein the exclusions comprise at least one of: modifications to the covered location that affect the agreed metric plan and modifications to the agreed metric plan.

26. The insurance product of claim 19, wherein the exclusions comprise a failure of the insured to perform the duties of an insured.

27. The insurance product of claim 19, wherein the exclusions comprise shortfalls resulting from deviations in or related to a base line production.

28. The insurance product of claim 19, wherein the conditions comprise noncompliance with the agreed metric plan.

29. The insurance product of claim 18, wherein the agreed metric plan pertains to an industry.

30. The insurance product of claim 29, wherein the industry is at least one of:

a power industry, a chemical industry, a refining industry, and a manufacturing industry.

* * * * *